(12) United States Patent
Byker et al.

(10) Patent No.: US 6,446,402 B1
(45) Date of Patent: *Sep. 10, 2002

(54) THERMOCHROMIC DEVICES

(75) Inventors: Harlan J. Byker, Holland; Paul H. Ogburn, Mattawan, both of MI (US)

(73) Assignee: Pleotint, L.L.C., West Olive, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/608,248

(22) Filed: Jun. 30, 2000

Related U.S. Application Data

(63) Continuation of application No. 09/173,414, filed on Oct. 15, 1998, now Pat. No. 6,084,702.

(51) Int. Cl.[7] .............................. G02F 1/01; G02F 1/23
(52) U.S. Cl. ................... 52/173.3; 52/786.1; 52/171.3; 359/265; 359/275; 252/581
(58) Field of Search .................. 359/265, 275; 252/581; 428/426; 546/257; 52/171.3, 173.3, 306, 309.14, 515, DIG. 5, DIG. 17, 786.1, 786.11, 788.1, 783.1

(56) References Cited

U.S. PATENT DOCUMENTS

| | | | |
|---|---|---|---|
| 2,145,930 A | * 2/1939 | Herron | 52/786.13 |
| 3,457,138 A | * 7/1969 | Miller | 359/288 |
| 4,393,105 A | * 7/1983 | Kreisman | 428/34 |
| 4,421,560 A | * 12/1983 | Kito et al. | 106/21 |
| 4,848,138 A | * 7/1989 | Marshall | 73/40 |
| 5,027,574 A | * 7/1991 | Phillip | 52/171 |
| 5,105,336 A | * 4/1992 | Katoh et al. | 52/786.13 |
| 5,128,181 A | * 7/1992 | Kunert | 428/34 |
| 5,524,381 A | 6/1996 | Chahroudi | 47/17 |
| 5,525,430 A | 6/1996 | Chahroudi | 428/520 |
| 5,615,040 A | * 3/1997 | Watanabe | 359/288 |
| 5,621,017 A | 4/1997 | Kobayakawa et al. | |
| 5,763,502 A | * 6/1998 | Barker et al. | 521/174 |
| 5,983,593 A | * 11/1999 | Carbary et al. | 52/786.11 |

FOREIGN PATENT DOCUMENTS

| | | |
|---|---|---|
| DE | 196 30 560 A1 | 1/1998 |
| DE | 197 34 776 A1 | 2/1999 |
| EP | 0134633 | 3/1985 |
| EP | 0681018 A2 | 11/1995 |
| JP | 62006227 | 1/1987 |
| JP | 62 6227 | 3/1987 |
| WO | WO 92/16702 | 10/1992 |
| WO | WO 93/23987 | 12/1993 |
| WO | WO 94/02313 | 3/1994 |
| WO | WO 95/11127 | 4/1995 |
| WO | WO 96/18927 | 6/1996 |
| WO | WO 97/28467 | 8/1997 |

OTHER PUBLICATIONS

International Search Report for PCT/US99/24135, counterpart PCT application for USSN 09/173,414, mailed Mar. 3, 2000.
International Preliminary Examination Report for Application No. PCT/US99/24135 Mailed Oct. 16, 2000.

* cited by examiner

Primary Examiner—Lanna Mai
Assistant Examiner—Phi Diu Tran A
(74) Attorney, Agent, or Firm—Thompson Hine LLP

(57) ABSTRACT

The invention is an energy efficient, thermochromic device that may be used to allow sunlight or solar radiation into a building or structure when the ambient temperature is low and substantially blocks solar radiation when the ambient temperature is high, especially when sunlight is directly on the window.

156 Claims, 4 Drawing Sheets

THERMOCHROMIC DEVICES

CROSS REFERENCE TO RELATED APPLICATIONS

This Application is a continuation of U.S. application, Ser. No. 09/173,414, filed Oct. 15, 1998 now issued U.S. Pat. No. 6,084,702.

BACKGROUND OF INVENTION

Windows provide a significant design challenge for architects and builders. On the one hand, large, high transmission windows are desirable for providing an "open air" feeling to building occupants, significant solar or passive heat gain when the outdoor or ambient temperature is low and windows are desirable for allowing visible light into a building or structure to provide daylighting and thereby substantially reduce the need for electric lighting during the time when occupants are most often present. On the other hand, windows can allow in excessive amounts of solar heat when the outdoor or ambient temperature is high and air cooling or conditioning is already in use. This is especially true at certain times of the day and certain parts of a building when the solar radiation is shining directly on or through the windows.

An attempted solution to the problem is the use of window treatments like shades, drapes and blinds. However these are expensive, cumbersome and aesthetically undesirable solutions, particularly in large office buildings, hotel atria and public structures like airport terminals. Energy efficient windows based on thermochromic, photochromic, electrochromic and photoelectrochromic technologies have been proposed for providing variable transmission windows for use in buildings and structures. However, until now, none have shown the performance, durability, cost effectiveness and convenience to be used on a commercial basis.

SUMMARY OF INVENTION

This invention relates to energy efficient devices and windows that allow sunlight or solar radiation into a building or structure when the ambient temperature is low and substantially block solar radiation when the ambient temperature is high, especially when sunlight is directly on the window. This invention provides windows that allow passive solar heating and daylighting on colder days and still provide significant daylighting, while blocking solar heat build-up on warmer days, especially from sunlight shining directly on or through the windows of this invention. This invention also provides thermochromic devices such as variable transmission shutters for use as lenses or filters.

Ultimately, it is the outdoor or ambient temperature and the directness of the sun's rays that determine the need for energy blocking character of windows. In a number of embodiments of this invention, the windows of this invention spontaneously change to provide energy blocking under the appropriate conditions of temperature and directness of sunlight without the control mechanisms and user intervention required by most alternate technologies under consideration for use as dimmable windows. Other embodiments of this invention provide windows that can be controlled by users or be controlled automatically by, for example, electronic control mechanisms, if so desired.

Windows and devices of the invention have residual light energy absorbing character such that when exposed to sunlight, (especially direct sunlight on warm or hot days), the temperature of at least a portion of the total window structure is raised significantly above the ambient, outdoor temperature. The windows and devices of the invention combine thermochromic character with this residual light energy absorbing character, juxtaposed in such a manner that there is an increase in temperature of the materials responsible for the thermochromic character when there is an increase in temperature due to sunlight exposure of the materials responsible for the residual light energy absorbing character. The thermochromic character is such that the total light energy absorbed by the window increases as the temperature of the materials responsible for the thermochromic character is increased from the ambient, outdoor temperature to temperatures above the ambient, outdoor temperature.

The residual light energy absorbing character is provided by static light energy absorbing materials and/or thermochromic materials that have some light energy absorbing character at ambient, outdoor temperatures. Preferably, any light energy absorbing character of the thermochromic materials at ambient outdoor, temperatures that contributes to the residual light energy absorbing character is due to the more colored form of the thermochromic materials that exists because of the thermal equilibrium between the less colored and more colored forms at outdoor, ambient temperatures or is due to the coloration of the less colored form and is not due to photochromic activity of the thermochromic materials. Preferably, the residual light energy absorbing character is such that the window is capable of absorbing about 5% or more and more preferably about 10% or more of the energy of solar irradiance incident on the window or device apart from any absorption changes caused by sunlight exposure. Preferably, the residual light energy absorbing character is such that there is a temperature increase in the materials responsible for the thermochromic character of at least 10° C. and more preferably of at least 20° C. above the ambient, outdoor temperature when the window or device is exposed to direct or full sunlight.

The thermochromic character can be provided by essentially any material or materials which change reversibly from absorbing less light energy to absorbing more light energy as the temperature of the material or materials is increased. It is preferred that the thermochromic character be provided by materials that have a smaller absorption at outdoor, ambient temperatures on warm and hot days and have an increase in absorption when the temperature of the materials responsible for the thermochromic character is increased at least 10° C. It is preferred that the thermochromic character be provided by materials that have even less absorption at outdoor, ambient temperatures on cool and cold days and a less significant increase in absorption when the temperature of the window increases due to exposure to direct or full sunlight on cool and cold days.

The windows or devices of the invention optionally combine other characteristics like low emissivity, infrared light reflectance, barrier properties, protective overcoating, multipane construction and/or special gas fills to provide energy efficient windows.

Energy efficient windows and devices of the invention comprise one or more thermochromic layers which change from absorbing less light energy to absorbing more light energy as the temperature of the thermochromic layer(s) is increased. For many of the thermochromic layers used in the invention, this means a change from less colored to more colored as the temperature of the thermochromic layer(s) is increased.

Windows and devices of the invention comprise one or more substrates, (i.e. window pane, panel, light or sheet). The substrate may be a thermochromic layer or the substrate may have thermochromic layer(s) provided thereon. Windows of the invention may comprise two or more substrates spaced apart by spaces containing gas or vacuum.

Windows and devices of the invention optionally comprise a barrier to short wavelength light. The short wavelength light may be ultraviolet (UV) light. The short wavelength light may, optionally, include short wavelength visible (SWV) light. The barrier may absorb some or all of the UV and/or SWV light incident on the barrier layer. The barrier may be a substrate, a portion of a substrate, (e.g., the barrier may be in a polymeric layer adhering two sheets of glass together), or the barrier may be a layer provided on a substrate. The barrier, if present, is located between the sun and the thermochromic layer and serves to protect and/or modify the behavior of the thermochromic layer and possibly other layers present. The barrier can protect other layers, for example, from photodegradation by UV light and can modify the behavior of the thermochromic layer by suppressing some or all of the photochromic character of materials present which have both thermochromic and photochromic character. In many cases, the thermochromic materials will be incorporated into a polymeric material which includes an additive such as a UV stabilizer. While this stabilizer does not ordinarily provide the equivalent effect of a barrier layer, devices have been constructed without a barrier layer when a UV stabilizer is present in the thermochromic layer.

Windows and devices of the invention optionally comprise a protective overcoat. This overcoat, if present, serves to protect the thermochromic layer and optionally any other layer which may be present from, for example, physical abrasion, oxygen and environmental contaminants. The thermochromic layer is located between the sun and the protective overcoat, if it is present, e.g., a window pane of glass/thermochromic layer/protective overcoat may be oriented with the overcoat on the inside surface of the window structure.

Windows and devices of the invention optionally comprise one or more static light energy absorbing materials. These materials provide relatively constant light energy absorption, (i.e. absorption which is not significantly dependent on the temperature or photochemical processes of the light energy absorbing material). The static light energy absorbing material(s), if present, serves to provide residual light energy absorbing character and thus absorbs enough light energy during direct or full sunlight exposure to raise the temperature of at least a portion of the window above the ambient temperature surrounding the window. This helps to make the windows responsive to the directness of the sunlight. The static light energy absorbing materials may be contained in a separate layer, in the substrate, and/or any of the other layers present including the thermochromic layer as long as the absorbed energy is able to warm the themochromic material to a temperature at which the thermochromic material increases in sunlight absorption.

Windows and devices of the invention optionally comprise one or more low emissivity, (low-e), layers. The low-e layer(s) helps provide energy efficiency by its ability to reflect infrared, (IR), light and/or its ability to poorly emit or radiate IR light.

For the purposes of this invention, different types of light or electromagnetic radiation are defined, based on wavelengths of the radiation, as follows:

| | |
|---|---|
| Ultraviolet Light, (UV) | 380 nanometers to the shortest wavelengths of light produced by the sun |
| Short Wavelength Visible Light, (SWV) | 380 nanometers to 495 nanometers |
| Visible Light | 380 nanometers to 750 nanometers |
| Near Infrared Light, (NIR) | 750 nanometers to 3200 nanometers |
| Infrared Light, (IR) | 750 nanometers to 50,000 nanometers. |

THERMOCHROMIC LAYER

Figure 1A:
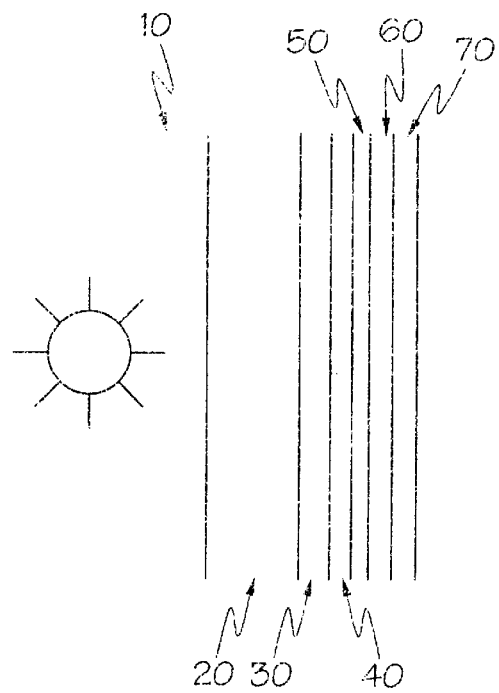
FIG. 1 shows a variety of structures for the windows and devices of the invention.

The thermochromic layer is comprised of one or more thermochromic materials. Numerous thermochromic materials are known and commercially available which change from black or colored to less colored or colorless as the temperature of the materials is increased. Thermochromic materials are also known which change from less reflecting to more reflecting of NIR light as the temperature of the materials is increased. While it is possible to combine such materials into the windows and devices of this invention, at least one of the thermochromic materials used in this invention changes from less light energy absorbing to more light energy absorbing as the temperature of the thermochromic material is increased. This often means a change from colorless or less colored to colored or more colored as the temperature of the materials is increased.

The thermochromic materials change in a reversible manner, such that a material which increases in light energy absorption as the temperature increases will decrease in light energy absorption back to its original light absorbing condition as the temperature of the material decreases back to the original temperature. For the present invention, thermochromic materials are preferred which can reversibly cycle back and forth between absorbing less light energy and absorbing more light energy many thousands of times as the temperature cycles back and forth. The thermochromic materials should be thermally and photochemically stable throughout their use in the devices of the invention.

The thermochromic material(s), which increases in coloration or light energy absorption as the temperature of the material(s) is increased, may be chosen from any of those known in the art which have this characteristic. The art of thermochromic materials has been reviewed by J. H. Day in Chemical Reviews 63, 65–80 (1963); Chemical Reviews 68, 649–657 (1968); and "Kirk-Othmer Encyclopedia of Chemical Technology", $3^{rd}$ Edition, Vol. 6, Pp. 129–142, John Wiley and Sons, Inc. (1979). Some of the thermochromic art is also described by G. J. Sabongi in "Chemical Triggering, Reactions of Potential Utility in Industrial Processes", Chapter 5, pp. 240–278, Plenum Press (1987). The thermochromism of a variety of photochromic materials is discussed by R. C. Bertelson and others in "Photochromism" edited by G. H. Brown, John Wiley and Sons, (1971). Preferred among the thermochromic materials in the art which increase in coloration as the temperature increases are the compounds with the structures shown below:

Indolino-benzospiropyrans

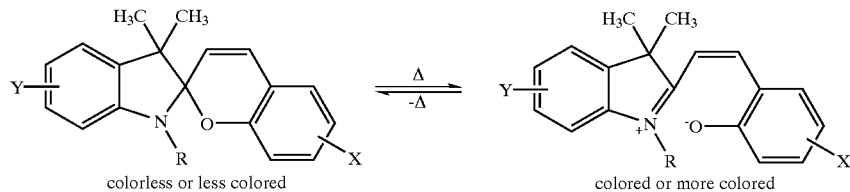

colorless or less colored        colored or more colored

Indolino-naphthospiropyrans

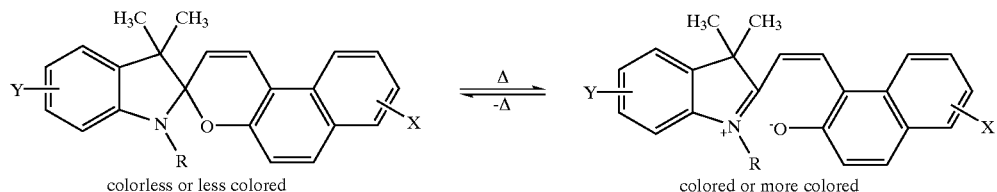

colorless or less colored        colored or more colored

Benzothiazoline-naphthospiropyrans

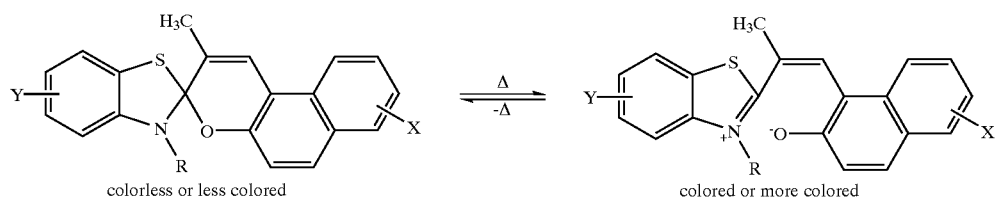

colorless or less colored        colored or more colored

Dinaphthospiropyrans

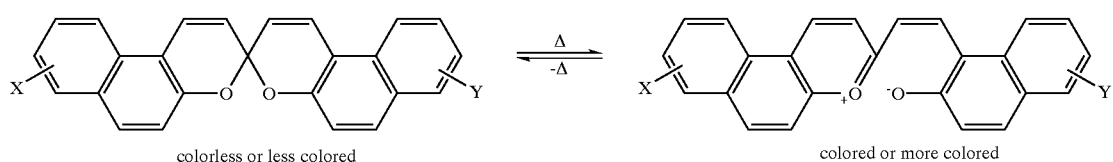

colorless or less colored        colored or more colored

Indolino-naphthospirooxazine

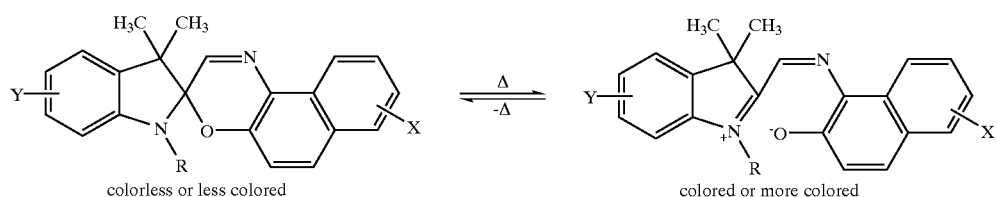

colorless or less colored        colored or more colored

Oxazepino-spirooxazines as disclosed by Castaldi and Allegrini in U.S. Pat. No. 5,055,576. The substituents $R_1$ through $R_{12}$ are as defined in the disclosure of U.S. Pat. No. 5,055,576.

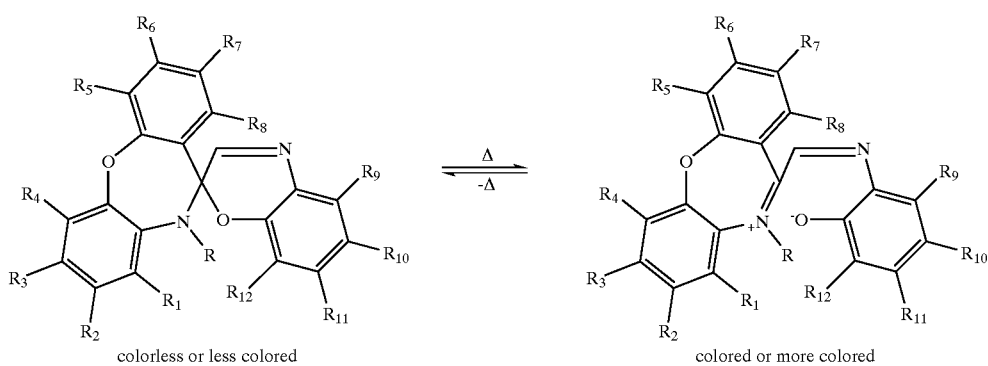

colorless or less colored        colored or more colored

Spiro-3,6-dihydroxyfluorene-phthalanones, (structure shown), and spiro-3,6-dihydroxyfluorene-1,3-dihydro-2,2-dioxybenzoisothiophenes, (structure not shown), as disclosed by Kampe et. al. in U.S. Pat. No. 5,294,375. The substituents X and Y are chosen so as to include the substituents disclosed in U.S. Pat. No. 5,294,375.

The other most preferred materials are the spirooxazines, also sold for use as photochromic materials, known by the trade names Reversacol Sea Green and Reversacol Aqua Green by Keystone Aniline Corporation of Chicago Ill. The reported structure for these compounds are as shown below:

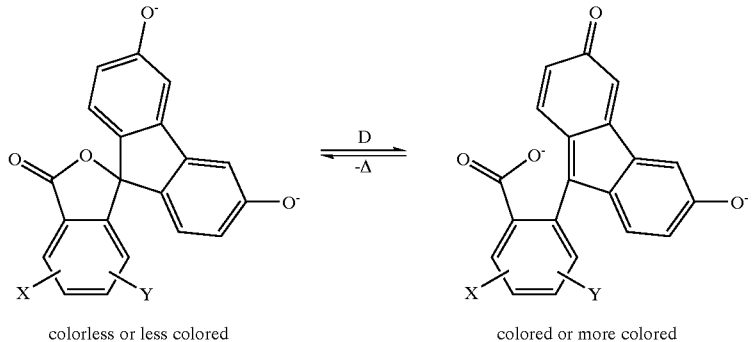

colorless or less colored      colored or more colored

Acridino-naphthospiropyrans

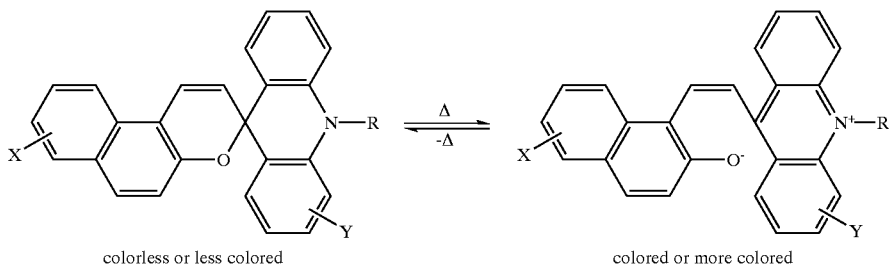

colorless or less colored      colored or more colored

Unless otherwise designated above, the X and Y substituents of the above structures are chosen so as to reflect the substituents described on these compounds in the review articles on thermochromic and photochromic materials cited above.

One of the most preferred thermochromic materials is a spirooxazine sold for use as a photochromic material under the trade name Reversacol Palatenate Purple by Keystone Aniline Corporation of Chicago Ill. The reported structure is shown below:

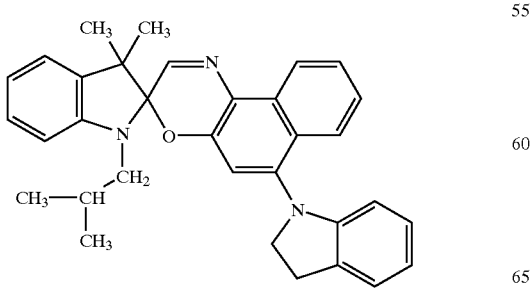

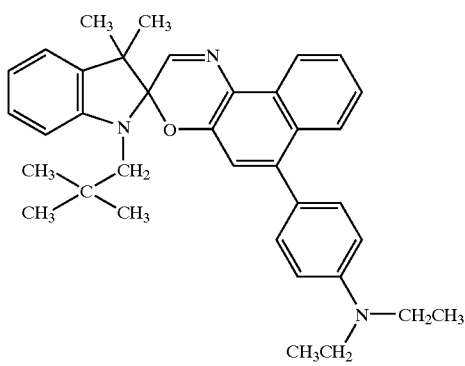

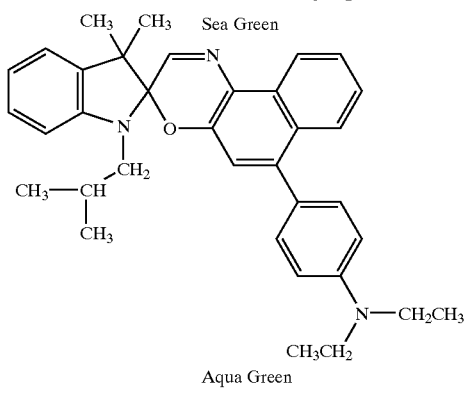

Aqua Green

Besides the spiro compounds whose structures are given above, thermochromic systems that change from colorless or less colored to colored or more colored as the temperature increases based on temperature dependent proton transfer are also useful in the devices of the invention. Preferred systems of this type are those described in U.S. Pat. No. 4,421,560 to Kito et. al. and by Tsutsui et. al. in Japanese Journal of Applied Physics, 33, 5925–5928 (1994).

Another type of thermochromic materials useful in the present invention is the class of compounds known as chromenes, often of interest for their photochromic properties. Several chromenes and additional spiro-oxazine compounds of interest are listed in U.S. Pat. No. 5,621,017 to Kobayakawa and Momoda.

Most thermochromic materials, which in their colored condition absorb visible light, only absorb visible light at specific wavelengths and thus appear to have a particular color. To achieve a color other than the particular color of an individual thermochromic material two or more thermochromic materials or thermochromic systems may be combined. In order for the composite color of two or more materials to be consistent over a particular range of temperatures, the temperature activation profiles for color change of the materials should be similar, (i.e. they should have changes from colorless or less colored to colored or more colored over about the same temperature range). In addition, the thermochromic materials should not significantly effect the color changing characteristics of the each other or they should be contained in separate layers. The mixing and matching of compounds to achieve a particular color is well known in the art of paints and the art of dyes and dyeing and these arts can be used as a guide in choosing combinations of thermochromic materials for the present invention. Guidelines can also be found in "Principles of Color Technology", $2^{rd}$ Edition", F. W. Bilhneyer Jr. and M. Saltzman, John Wiley and Sons, Inc. (1981). Often gray is a desirable color and this appearance can be achieved by having a relatively flat or structureless absorption curve across the visible spectrum or by combining thermochromic materials that, when colored, transmit relatively similar amounts of light of the complimentary colors blue, green and red. Preferably the chroma ($C^*_{ab}$) of the device in full sunlight is less than 20.

One of the most promising combinations of thermochromic materials for the devices of the present invention is the Reversacol Palatenate Purple and 1',3'-dihydro-1',3',3'-trimethyl-5'-methoxy-6-nitrospiro[2H-1-benzopyran-2,2'-(2H)-indole] (Chroma Dye 88, available from Chroma Chemicals Inc. of Dayton, Ohio). Chroma Dye 88 is also a preferred thermochromic material. When these two thermochromic materials are combined in a propylene carbonate solution with polyvinylacetate and 2-hydroxy-4-methoxybenzophenone, a film can be prepared, by evaporation of the propylene carbonate, which is grayish/reddish/brown. As the temperature is increased the film turns a bluish/gray. This compares to a film qualitatively the same but with just Reversacol Palatenate Purple as the thermochromic material which turns from green to dark bluish/green as its temperature is raised and a film qualitatively the same but with just Chroma Dye 88 as the thermochromic material which turns from light reddish/brown to dark reddish/brown as its temperature is raised.

Another preferred thermochromic material is 1',3'-dihydro-1'-dodecyl-3',3'-dimethyl-6-nitrospiro [2H-1-benzopyran-2,2'-(2H)-indole], (Chroma Dye 37, available from Chroma Chemicals Inc. of Dayton, Ohio). A thermochromic film with Chroma Dye 37 in poly(vinyl butyral-co-vinyl alcohol-co-vinyl acetate) and 2-hydroxy-4-octyloxybenzophenone changes from light red to progressively darker purple and then blue/purple as the temperature of the film is increased.

The thermochromic layer may contain multiple thermochromic materials with various activation temperatures for color change. For example, a window may contain a small amount of a thermochromic material that develops a significant amount of color at about 25 to 30 C. The window may also contain one or more additional thermochromic materials that develop significant color at higher temperatures, such as 35, 45 and/or 55 C. This allows for a more gradual increase in coloration as the temperature increases.

The thermochromic layer may be made up of multiple layers containing different thermochromic materials or thermochromic systems especially if the thermochromic materials or thermochromic systems adversely effect each others behavior when they are contained in the same layer.

The temperature at which significant thermochromic activity is obtained can be designed into a layer by the choice of thermochromic material or substituents on the material or the environment around the material. For example, for the thermochromic compounds whose structures are given above which contain a pyran ring, placing an electron withdrawing substituent on the pyran side of the molecule and/or an electron donating substituent on the other side of the molecule tends to lower the temperature at which significant thermochromic coloration takes place. For the thermochromic compounds whose structures are given above which contain an indole moiety, placing a bulky alkyl group, (like isopropyl, tertiarybutyl, isobutyl or neopentyl) on the nitrogen of the indole also tends to lower the temperature at which significant thermochromic coloration takes place. Decreasing the polarity of the environment around the thermochromic materials tends to increase the temperature at which significant thermochromic coloration takes place and vice versa. The polarity around the thermochromic material can be affected by solvents or plasticizers in a polymer matrix which contains the thermochromic material or the polarity can be affected by the choice of polymer itself and/or the polarity of functional groups in or on the polymer. The "openness" of the polymer matrix also effects the ability of the spiro type thermochromic compounds to ring open to their colored form. Polymers with low crosslink density, large void or interstitial spaces or polymers with low glass transition temperatures tend to favor coloration at lower temperatures.

The range of outdoor or ambient temperatures in which it is desirable for the thermochromic layer to be active is about 20° C. to 55° C. In the presence of the proper amount of residual light energy absorbing character and direct sunlight exposure the temperature of the thermochromic layer itself is typically about 30° C. to 90° C. The temperature range of about 30° C. to 90° C. is the range in which significant increases in the coloration of the thermochromic layers of the devices of the invention take place.

Many of the above thermochromic materials are also photochromic. Many of those that are photochromic become significantly colored if they absorb UV and/or SWV light at temperatures between about 10° C. and 30° C. The rate of thermal bleaching of the photocolored state or rate of return to thermal equilibrium increases with increasing temperature so that at about 35° C. to 40° C. many of the photochromically active materials exhibit very little steady state photo-induced coloration. As indicated below, this photochromic activity also may be blocked or controlled by using a barrier to absorb UV or UV and SWV light. However, the thermal equilibrium between the less colored form and the more colored form shifts toward increasing concentration of the more colored form, as the temperature is increased, for many of the thermochromic materials whose structures are given above. The preferred thermochromic materials and thermochromic systems are those which have a large increase in coloration due to the thermal equilibrium shift over the temperature range of about 30° C. to 90° C.

Unfortunately, the more colored form of some of the materials whose structure are given above can be converted to the less colored form by the absorption of visible light from the sun in a so called photo-bleaching reaction. This photo-bleaching reaction is undesirable for the thermochromic materials used in the devices of the present invention. For example, a thermochromic layer containing 1',3'-dihydro-1'-ethyl-3'-ethyl-3'-methyl-6-nitrospiro [2H-1-benzopyran-2,2'-(2H)-indole], (Chroma Dye 47, available from Chroma Chemicals Inc. of Dayton, Ohio) turns from light red to dark red on heating from 20° C. to 60° C. in the absence of sunlight in films of polymethylmethacrylate, polyvinylacetate and poly(vinyl butyral-co-vinyl alcohol-co-vinyl acetate) and appeared to be an excellent candidate for a thermochromic material and/or material for combination with other thermochromic materials in all of these polymer layers. However, heating in sunlight resulted in very little if any increase in light absorption for Chroma Dye 47 in polymethylmethacrylate and polyvinylacetate because of what is believed to be visible light induced conversion from the more colored form to the less colored form or photobleaching. This problem was not observed with Chroma Dye 47 in poly(vinyl butyral-co-vinyl alcohol-co-vinyl acetate) in the presence of 2-hydroxy4-octyloxybenzophenone. Chroma Dye 47 is a preferred thermochromic material for use in films containing poly(vinyl butyral-co-vinyl alcohol-co-vinyl acetate) especially those also containing benzophenone type UV absorbers which appear to accentuate the thermochromic activity of Chroma Dye 47. The thermochromic material Chroma Dye 88 suffers from this photobleaching phenomena in some polymer systems, but to a lesser extent in general than Chroma Dye 47 and can still be used in thermochromic layers particularly in combination with other thermochromic materials.

The thermochromic and photochromic coloring and bleaching of most spiro type thermochromic, (TC), materials may be summarized as follows:

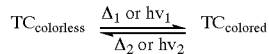

Thermochromic materials, that do not appear to be photochromic at a given temperature or intensity of sunlight exposure, do not change color upon absorption of $hv_1$ or have a high rate of thermo- or photo-bleaching. Thermochromic materials, that are photochromic, can have their photochromic nature eliminated or modified by a barrier that absorbs all or part of the light of energy $hv_1$ before it reaches the thermochromic/photochromic material. Also, the photochromic activity of a thermochromic material can be modified, either enhanced or suppressed by the environment around the material, (type of polymer matrix, plasticizer(s), adsorption of the thermochromic material on metal oxides such as silica and alumina and additives especially UV and SWV light absorbers contained in the same layer with the thermochromic/photochromic material). To avoid the undesirable photo-bleaching reaction, thermochromic materials are preferred which have low quantum yield for the bleaching process caused by absorption of $hv_2$ or for which little or no light of frequency $v_2$ reaches the thermochromic material. Surprisingly, thermochromic materials and layers have been found, and are described in the examples below, which incorporate the desirable features and avoid the pitfalls of these various thermal and photo induced reactions.

The windows of the invention change from transmitting significant amounts of solar energy to absorbing significant amounts of solar energy when the outdoor or ambient temperature is warm, (relative to the desired temperature of the interior of the building or structure containing the window), and the sunlight is direct. A largely photochromic layer in a window construction similar to the present invention would have the disadvantage of becoming significantly solar energy absorbing when the sunlight is directly on the window but the outdoor temperature is cool or cold, (relative to the desired temperature of the interior of the building or structure). In addition most photochromic materials color significantly on cloudy days due to the clouds transmitting enough UV to cause coloration, while cloudy days are usually cool and the clouds reduce the amount of photo-bleaching due to visible light. This is a significant problem if the window is intended to provide room lighting, (also known as daylighting), because the window would be darkened when the amount of visible light from the sun is low and thus even more electric lighting would be required in the room.

However, a small amount of photochromic character may be combined with the thermochromic character by the presence of, for example: (1) a small or modest amount of a photochromic material; (2) a substantial amount of photochromic material whose photochromic activity has been partially suppressed; and/or (3) a small amount of photochromic activity in a thermochromic material. In addition to the residual light energy absorbing character, the color change due to the photochromic activity causes some absorption of solar energy especially from direct sunlight and a temperature rise in the layer containing the photochromic activity and any contiguous layers. When the outdoor temperature is warm, this additional temperature rise can cause more color change in thermochromic materials contained in the same layer and/or contiguous layer. When the outdoor temperature is cool or cold, the color change and temperature rise due to a small amount of direct sunlight induced photochromic activity is not sufficient to induce significant thermochromic reactions nor block significant amounts of solar energy from entering the building or structure.

Typically the thermochromic layer is a layer of uniform thickness and properties that has approximately the same area as the viewing area of the window with which it is associated. To form a thermochromic layer, the thermochromic material may be coated as a pure material on another layer or a substrate or preferably the thermochromic material is incorporated into a polymer matrix. The polymer matrix may be the substrate it self or it may be a separate layer coated on the substrate or another layer. The thermochromic for example, by providing thermochromic materials in the monomer portion of the formulation for acrylic sheet material manufacture. The thermochromic materials may be incorporated into a formulation for coating on the substrate or on another layer by dissolving the thermochromic material and the polymer(s) in a suitable solvent of multi-solvent system, optionally, along with additives, (such as UV absorbers, heat and light stabilizers, antioxidants, plasticizer (s) and static light energy absorbing materials). The thermochromic layer forming solution or formulation may be applied by a variety of means including solvent casting, spraying, spin coating, screen or offset printing and doctor blading. After application, the film is formed by evaporation of some or all of the solvent(s).

Alternatively, the thermochromic layer can be formed by mixing the thermochromic material(s) in with a polymer forming formulation and curing or reacting the formulation. The polymer forming formulation is normally applied to substrate of other layer before curing or reaction, but in the case that the formulation contains the proper solvent system, it may be applied after curing or reacting. The polymer forming formulation may be comprised of one or more polymer forming monomers and/or one or more polymer forming oligomers and optionally may be comprised of one or more polymers, one or more catalysts, one or more initiators, one or more plasticizers, and/or one or more solvents. The polymer forming formulation may be cured or reacted by thermal or radiative means. The polymer forming formulation may give rise to a thermoplastic polymer layer or the formulation may provide for crosslinking and give rise to a thermoset polymer layer. The polymer forming formulation may optionally contain additives such as UV absorber(s), heat and light stabilizer(s), antioxidant(s), plasticizer(s) and static light energy absorbing material(s) to be incorporated into the thermochromic layer along with the thermochromic material(s) or thermochromic system(s).

Preferably the thermochromic material(s) or thermochromic system(s) is permanently dissolved in the polymer matrix or polymer/plasticizer combination or at least remains in the matrix in a dispersed fashion such that very few if any light scattering particles form and the thermochromic material(s) is not "fugitive" in that it does not diffuse or migrate out of the matrix. The thermochromic material may be covalently bonded to the polymer chain by, for example, providing a methacrylate substituent on a thermochromic material and copolymerizing it with methylmethacrylate to form a polymer.

Examples of polymer materials, for use in thermochromic layers, include acrylics, urethanes, vinyls, polyvinylbutyrals, acetates, propionates, butyrates, polystyrenes, polyamides, polyimides, fluorocarbon polymers, polyesters and polycarbonates. Preferred are polymethylmethacrylate, polyethylmethacrylate, polyvinylbutyrals, polyvinylacetates, polyvinylbutyrates and copolymers of the aformentioned and polymer blends of the aforementioned polymers.

As prepared, the thermochromic layer may be essentially colorless and absorb very little solar energy or may be somewhat colored and solar energy absorbing thus providing residual light energy absorption. It has been discovered that the preferred thermochromic materials like the Reversacols Palatenate Purple, Aqua Green and Sea Green have enough visible light energy absorbing character at 20° C. to 25° C. when dissolved in a polymer matrix to provide heating of the thermochromic layers when exposed to direct sunlight on a warm day. The solar energy absorbed by the thermochromic material(s) in the thermochromic layer may be nearly 0% to as high as about 50% at temperatures of 20° C. to 25° C. As the temperature increases from, for example, 20° C. or 25° C. to temperatures typically reached in the windows on warn or hot days in direct sunlight of 30° C. to 90° C, the transmission of the window typically decreases by as much as 35 to 45 percentage points. So a window with say 80% transmission can decrease to at least as low as 45% to 35% solar energy transmission and a thermochromic layer with say 55% transmission can decrease to at least as low as 20% to 10% solar energy transmission. In order to achieve this performance, the polymer type thermochromic layers range in thickness from about 0.001 centimeters to about 0.1 centimeters and preferably from about 0.01 centimeters to about 0.05 centimeters. The total thermochromic material content in the polymer type thermochromic layers ranges from about 0.1 weight % to about 20 weight %.

Substrates

The substrates which form the windows and devices of the invention, may be plastic, glass or combinations thereof. The substrates are light transmitting, meaning they transmit some and in most cases a majority of the visible and/or NIR light incident on the substrates. The substrates may themselves be a thermochromic layer, if the substrate is plastic and one or more thermochromic materials is dispersed in the plastic sheet. The substrates may be coated with one or more of the layers of the invention or two or more substrates may be laminated together by one or more of the other layers of the invention.

If the substrate is plastic it may be rigid or flexible and may be acrylic, (e.g. polymethylmethacrylate), sheet material, polycarbonate sheet material, polyester, various types of vinyl, fluorocarbon polymers, polyolefins, polystyrene, polyurethane, acetate or any plastic material that can be formed into transparent sheets, either rigid or flexible. Plastic substrates that are directly exposed to the environment can be coated with "hard coat" materials such as those formed from polysiloxanes and/or deposited silica to provide scratch and abrasion resistance or they may be coated with "self-healing", scratch resistant films like those made from certain polyurethanes.

A particularly advantageous embodiment of the present invention for certain applications involves a flexible plastic substrate coated with a thermochromic layer which can be adhesively bonded to a glass sheet. The preferred flexible substrate is a polyester film already coated with a low emissivity coating, (low-e coating, see below), such as the products sold under the name Solis® by Southwall Technologies of Palo Alto, Calif. This type of substrate is coated with, for example, a thermochromic layer and then coated with a barrier layer which has adhesive properties. The thermochromic layer and the barrier layer are placed on the substrate on the side opposite of the side already coated with a low-e coating. The coated polyester film can then be bonded to a flat or curved piece of glass, either in a building or a motor vehicle, and thus provide a means retrofitting existing windows with the energy saving features of the present invention.

If the substrate is glass it may be soda/lime glass, borosilicate glass or any of a variety of clear or tinted glass types commonly known in the art of glass making. The glass may be formed into sheets by various processes including the drawn sheet process or the floatline process. Preferred is soda/lime glass, particularly soda/lime glass made into sheet form in the floatline process.

A particular advantage of the present invention over electro-optic means of varying light transmission through windows is the lack of need for transparent electrodes in contact with the variable transmission layer. This dramatically simplifies the use of tempered glass substrates, since in the case of transparent electrodes, one must choose between the difficult processes of either tempering glass with the transparent electrode in place or coating the already tempered glass with a transparent electrode layer. Thus, in the present invention the glass can be air or heat tempered or chemically toughened or strengthened by conventional means prior to coating with some or all of the following layers: a UV barrier layer, a thermochromic layer, a protective overcoat layer, a low-e layer. This simplification in the use of tempered, toughened or strengthened glass has major advantages for use of the devices or windows of the invention for automotive glazing, building skylights, windows that are part of the roofing or other non-vertical glazing and windows near floors and doors or where ever specially treated or tempered glass is required. Even windows of the invention used in vertical glazing situations may benefit from tempering when the windows are thermally stressed because they are hot or non-uniformly heated, (due, for example, to passing clouds or partial shading by nearby buildings). A significant advantage may be realized in high thermal stress conditions by edge treatment of the glass like for example careful seaming or "pencil edging" even when the glass is not tempered.

A similar advantage, as that for tempering, is realized with the present invention for the use of curved or bent glass substrates, (i.e. substrates with a non-infinite radius of curvature). For electro-optic devices these substrates are difficult to precisely bend with transparent electrodes already in place and are difficult and expensive to provide with transparent electrodes once the substrates are bent. The thermochromic process in the present invention does not require transparent electrodes and thus can provide variable transmission layers on curved substrates nearly as easily as flat substrates.

Substrates can also be made up of combinations of plastic and glass sheet materials. A substrate may consist of two pieces of glass laminated together with, for example polyvinylbutyral or polystyrene. Alternatively, the substrate may be any of a variety of security glazings which contain alternating layers of plastic sheet materials like polycarbonate or acrylic and glass sheets, tempered or not, bonded together with, for example, sheets of polyvinylbutyral and/or polystyrene. The substrate can even be a combination of glass or plastic and metal such as in wire glass windows where a metal wire mesh is fused between two pieces of glass or plastic. An advantageous embodiment of the invention is the use of the thermochromic layer and/or a barrier layer as a laminating layer or as part of the laminating layer for glass and/or plastic substrates. For example, thermochromic materials can be incorporated into a polyvinylbutyral sheet and used to laminate two curved pieces of glass together for an automotive sunroof or windshield.

The thickness of the substrates can range from 20 to 30 microns for flexible sheets of plastic and the thinnest drawn sheet glass to 7 or 8 centimeters for the thickest multilayer security glazings. Generally, for flexible substrate applications, the substrate thickness will range from 25 to 250 microns and for devices or windows utilizing soda/lime floatline glass the substrate thickness will range from 1 to 10 millimeters.

Figure 4:
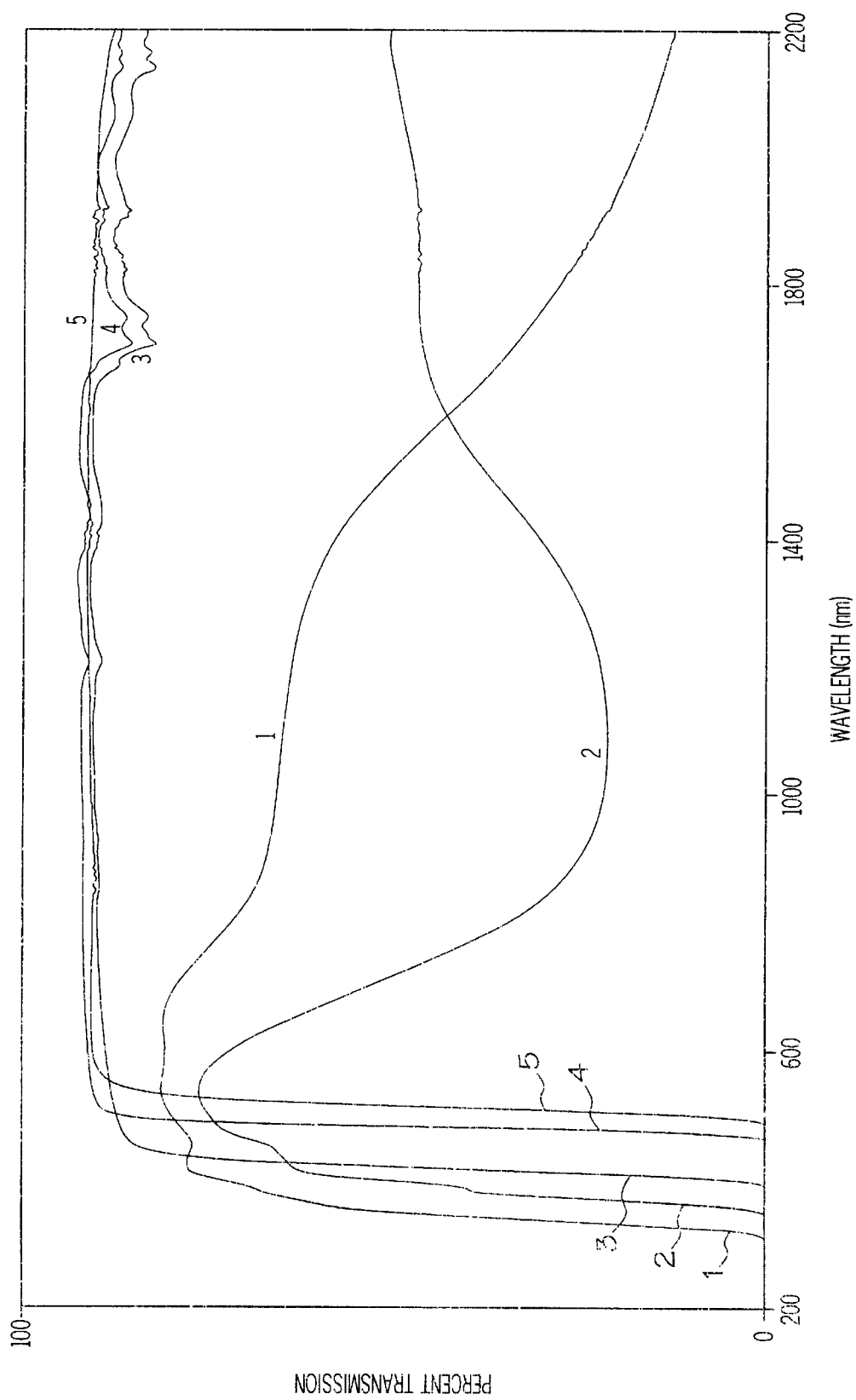
FIG. 4 shows the transmission spectra for various substrates and barrier layers.

A preferred glass substrate is the tinted float line glass known as EverGreen™ glass available from Pilkington-Libbey Owens Ford of Toledo, Ohio, the transmission spectrum of which is shown as curve 2 of FIG. 4. Other preferred glass substrates are Solargray® glass and Solarbronze® glass available from PPG Industries, Inc. of Pittsburgh, Pa. Preferred plastic substrates are flexible plastic sheets already coated with a low emissivity layer such as Solis® polyester films available from Southwall Technologies of Palo Alto, Calif.

Barrier Layers

A barrier which blocks some or substantially all of the UV light and optionally blocks all or a portion of the short wavelength visible, (SWV), light incident on the barrier may be provided as part of the window. The barrier, if present, is located between the sun and the thermochromic layer of the windows of the invention. The barrier may be the substrate itself or a layer on the substrate, preferably between the substrate and the thermochromic layer. The purpose of the barrier is to prevent short wavelength, high energy photons from the sun from reaching the thermochromic layer and thereby protect the components of the thermochromic layer from possible degradation. Also, many thermochromic materials are photochromic in that they change from colorless or less colored to colored or more colored on exposure to UV and/or SWV light. A UV barrier which, optionally is also a barrier to SWV light, may prevent, minimize or modify the photochromic reactions of those thermochromic materials which happen to be capable of photochromic activity.

If the substrate itself is a barrier it may be made up of various types of glass with, for example high iron content or added metal oxides or other materials that are good absorbers of UV and/or SWV light. Plastic substrates may be good barriers due to inherent short wavelength light absorption of the plastic material and/or additives, dyes or pigments incorporated into the plastic material.

Alternatively the barrier layer, if present, may be made up of a film or layer of inorganic material, organic material or a combination of the two. Examples of inorganic materials are titanium dioxide, zinc oxide, cadmium oxide, tungsten trioxide and mixed oxides combining two or more of such materials. An inorganic barrier layer can be applied to the substrate by a variety of means such as chemical vapor deposition, physical vapor deposition, (e.g. sputtering, electron beam evaporation, and ion plating), plasma spray techniques or sol-gel processes. A barrier can be provided by a stack of thin film materials, (dichroic stack), with thickness and index of refraction chosen so as to reflect UV and/or SWV light.

An organic barrier may be made up of a layer of polymer material that is inherently absorbing of the wavelength of light of interest or contains light absorber or stabilizer materials mixed, (dissolved or interspersed) into the polymer material or covalently bonded to the polymer itself. Examples of polymer materials include polyethylenes, polypropylenes, polybutylenes, epoxies, acrylics, urethanes, vinyls including polyvinyl chloride, polyvinylbutyrals, acetates, polystyrenes, polyimides, polyamides, fluorocarbon polymers, polyesters, polycarbonates, copolymers of the aformentioned and polymer blends of the aforementioned polymers. Preferred are polymethylmethacrylate, polyethylmethacrylate, polyvinylbutyral, polyvinylacetate and a copolymer of vinyl butyral, polyvinyl alcohol and polyvinylacetate.

A large number of light absorbers and/or stabilizer materials are known in the art and particularly useful ones include benzotriazoles, benzophenones, cyanoacrylates, hindered amines, oxalanilides and substituted triazines. These materials are efficient absorbers of UV and sometimes of SWV light. Materials that are not good short wavelength light absorbers but provide increased stabilization in the barrier layer are hindered amine light stabilizers, (HALS). Preferred short wavelength light absorbers and light stabilizers for use in the barrier layers and the other layers of the invention are those described by M. Dexter in "Kirk Othmer Encyclopedia of Chemical Technology, $3^{rd}$ Edition, Vol. 23, Pp. 615–627, John Wiley and Sons, Inc. (1983). Most preferred are 2-hydroxy-4-methoxybenzophenone, 2-hydroxy-4-octyloxybenzophenone, ethyl 2-cyano-3,3-diphenylacrylate, 2-ethylhexyl 2-cyano-3,3-diphenylacrylate, 2-(2'-hydroxy-5'-methylphenyl)benzotriazole, and 2-[2'-hydroxy-3',5'-(di-tertiaryamyl)phenyl]benzotriazole. The preferred HALS is bis(1,2,2,6,6-pentamethyl-4-piperidinyl) (3,5-di-tertbutyl-4-hydroxybenzyl)butylpropanedioate.

An example of a UV absorber covalently attached to the polymer is provided by a copolymer prepared by free radical initiated polymerization of a mixture of 2-[3-(2H-Benzotriazol-2-yl)-4-hydroxyphenyl]ethyl methacrylate and methyl methacrylate, both available from, for example, Aldrich Chemical Company of Milwaukee, Wis. This copolymer has the advantage that the UV absorber is not able to be leached out or diffuse out of the polymer over long periods of time.

SWV light absorbers may be a variety of tinted glasses such as those used for cutoff filters. SWV light absorbers may also be variety of yellow dyes and/or dyes which absorb violet and blue light which are good barriers to all or a portion of the SWV light.

The preferred SWV light absorber for polymer films is quinoline yellow, (also known as Solvent Yellow 33 and Colour Index No. 47000). The color produced by the SWV light absorbers may be modified or compensated for by other materials included in the window structure which are somewhat absorbing in other parts of the visible spectrum. For example a small amount of red dye may be combined with a yellow dye to produce a transparent amber colored barrier to short wavelength light. The SWV light absorbers and any color compensating light absorbers may constitute or may contribute to the residual light energy absorbing character of the window.

If a barrier layer(s) is applied to the substrate, it can be applied by any of the means described above for the thermochromic layer(s). This includes the solution based methods, the curing based methods and combinations thereof The concentration of UV and/or SWV light absorbers in the barrier layer and the thickness of the barrier layer are chosen so as to prevent or modify the photochromic properties of the thermochromic material(s) and provide stability against sunlight degradation of the layers beyond the barrier layer(s). Typically the barrier layer(s) blocks, (absorbs or reflects), greater than 98% of the UV light of the sun reaching the window. The amount of SWV light blocked by the barrier depends on the amount of SWV light that would be absorbed by the particular thermochromic material (s) present and depends on whether or not it is desirable to have some photochromic activity.

A barrier to UV and SWV light is a 495 nanometer cutoff filter glass available from Edmund Scientific Company of Barrington, N.J. This barrier can be used as a substrate or bonded to a substrate. The transmission spectrum of this barrier layer is shown as curve 5 of FIG. 4.

Combinations of organic and inorganic UV barrier layers generally involve metal oxide particles dispersed in a polymer matrix. In general these dispersions are light scattering due to the refractive index mismatch between the metal oxide particles and the polymer matrix and thus they appear hazy.

Typically the barrier layer is a layer of uniform thickness and properties that has approximately the same area as the viewing area of the window with which it is associated. Barrier layers that are inorganic metal oxide films are typically 100 to 1000 nanometers thick. Organic or polymer based barrier layers are typically 0.005 centimeters to 0.1 centimeters thick and typically contain from 1 to 50 weight % UV light absorber and/or from 0.1 to 20 weight % SWV light absorber.

Organic and combination organic/inorganic UV barrier layers may also, optionally, contain plasticizers, antioxidants, heat stabilizers, fillers and as described below, static light energy absorbing compounds including visible and/or NIR light absorbers.

Protective Overcoat Layers

A thermochromic layer may, optionally, be coated with a protective overcoat layer or layers. This layer(s), if present, acts as a barrier to water or humidity, a barrier to oxygen, a barrier to environmental contaminants like ammonia, chlorine and sulfur containing compounds, a protective coating for handling of the coated substrate during further fabrication of a window structure or any combination of the foregoing.

The layer may be comprised of a very thin metal layer, a metal oxide layer or a combination of several metal and metal oxide layers. For example, a set of layers like 50 nanometers of zinc oxide or tin oxide, 10 nanometers of silver metal and 50 nanometers of zinc oxide or tin oxide coated on a thermochromic layer provides a combination of low-e character and protective overcoat character.

The protective overcoat layer may be an organic layer or coating such as a polymeric film optionally containing additives like antioxidants, desiccant, heat stabilizers, light stabilizers, light absorbers, plasticizers, pigments, fillers and/or a hard coat layer or self-healing scratch resistant layer. For example, a polymer film can be formed on the thermochromic layer by one of the processes described for formation of the thermochromic layer itself, but instead of containing thermochromic materials, it can contain an antioxidant like a hindered phenol and a desiccant like polyacrylic acid. Alternatively, a polymer with good oxygen barrier properties like polyvinylidene fluoride or anhydrous polyvinylalcohol can be coated on the thermochromic layer to minimize oxygen ingress into the thermochromic or other layers and thus minimize direct reaction with oxygen or indirect participation of oxygen in photodegradation processes in the thermochromic layer and/or other layers.

Static Light Energy Absorbing Material

In order to provide a temperature rise in the thermochromic layer due to direct sunlight, one or more static light energy absorbing materials may be contained in or added to one or more of the following: a separate static light energy absorbing layer, the substrate, the barrier layer, the thermochromic layer, the protective overcoat layer and the low-e layer. That the light energy absorbing materials are static means the materials constantly absorb visible and/or NIR light without any significant dependence on temperature or absorption of light. This means that the static light energy absorbing materials are not thermochromic or photochromic. Incorporating static light energy absorbing materials into the window structure is one means of providing residual light energy absorbing character to the devices or windows of the invention.

Static light energy absorbing materials are materials such as dyes, pigments, tinted glasses and inherently colored plastics. If static light energy absorbing material(s) is present, it is present at a level or concentration such that it absorbs from a few percent to about 50 percent or more of the visible and/or NIR light available in sunlight. The amount of static light energy absorbing material added depends on the amount of residual light energy absorption provided by other parts of the window, mainly the absorption of the thermochromic material at temperatures around 20° C. to 25° C. In general the static light energy absorbing material is present at a level or concentration such that the total residual light energy absorbing character results in about 10% to about 50% of the total sunlight energy incident on the window being absorbed.

If it is desired to maximize solar energy gain during cold weather periods, minimal tinting or only visible light absorbing tinting is provided by the static light energy absorbing material(s). On the other hand if maximum visible transmission of the window assembly is preferred, for example to minimize the use of electric lighting in a building, the static light energy absorbing material(s) can be essentially only NIR absorbing. The static light energy absorbing material(s) must be thermally stable with regard to degradation and diffusion or migration out of the layer(s) in which it is contained. It must also be photochemically stable with regard to prolonged sunlight exposure at least that portion of the solar spectrum that reaches the layer with static light energy absorbing character. The static light energy absorbing material(s) can play a key role in determining the color or hue of the window and can be chosen so as to give the window a desirable color directly or compensate for the color of another part of the window structure, like the residual color due to thermochromic materials which already have some color at ambient, outdoor temperatures. For example, a static light energy absorbing material that predominantly absorbs green light can be added to a layer of a window structure that contains a thermochromic layer that appears green in color at outdoor, ambient temperatures. UV absorbers or stabilizers may be added to the layer to provide enhanced stability for the light energy absorbing material(s).

A multitude of dyes, pigments and other materials both visible and NIR absorbing are known in the art of dyes, colorants and pigments. Preferred visible light absorbing dyes are 4,6-dinitro-4'-methyl-2,2'-azodiphenol, (Mordant Brown 6, C.I. 11875); 5-(4-nitrophenylazo)salicylic acid, (Mordant Orange 1, C.I. 14030); 1,4-bis(tolylamino)-9,10-anthraquinone, (Solvent Green 3, C.I. 61565) and 1,4-bis(n-butylamino)-9,10-anthraquinone, (Solvent Blue 35, C.I. 61554). Preferred NIR absorbing dyes are those that can also provide SWV light absorption like Keysorb 970 and Keysorb 1026 available from Keystone Aniline Corporation of Chicago, Ill. A separate static light energy absorbing layer containing these materials is typically 0.005 centimeters to 0.1 centimeters thick and typically contain from 0.1 to 5 weight % static light energy absorber. The static light energy absorbing layer can be prepared by the methods described for thermochromic layers or the static light energy materials can be incorporated into other layers by the means described for incorporating thermochromic materials and UV absorbing materials into layers.

A particularly advantageous method of providing static light energy absorbing character to windows of the invention is through the use of tinted windows or glass as substrates. Preferred substrates with static light energy absorbing properties are EverGreen™ glass available from Pilkington-Libbey Owens Ford of Toledo, Ohio and Solargray® glass and Solarbronze® glass available from PPG Industries, Inc. of Pittsburgh, Pa.

Additives

Any or all of the polymer based layers present in the devices of the invention may contain additives such as antioxidants, desiccants, singlet oxygen quenchers, heat stabilizers, light stabilizers, UV stabilizers, light absorbers, plasticizers, pigments and fillers. Many of these additives are known in the art of polymer films. Good, although not exhaustive lists of antioxidants, singlet oxygen quenchers, light absorbers, light stabilizers and pigments are given in columns 13 and 14 of U.S. Pat. No. 4,425,161 to Shibahashi et. al. and columns 3–7 of U.S. Pat. No. 5,688,592 to Shibahashi et. al.

Adhesion of Polymer Layers to Substrates

Over the life of a window or device of the invention it is important that any polymeric layer in contact with a substrate, whether it be a barrier layer, thermochromic layer, layer containing static light energy absorbing material or a layer with a combination of these characteristics, remain securely bonded to the substrate. Peeling, cracking and crazing can all be minimized by providing excellent adhesion of the polymeric layer to a substrate. Adhesion can be improved by the use of adhesion promoters such as coupling agents.

If the substrate is glass, adhesion can be promoted by the use of certain types of coupling agents, in particular silane coupling agents, although others may be used as well. An extensive discussion of coupling agents is given in "Silane Coupling Agents", $2^{nd}$ Edition, E. W. Plueddemann, Plenum Press (1991) and "Silanes and Other Coupling Agents", K. L. Mittal Editor, VSP BV (1992). Coupling agents can be added to a polymer solution that is to be applied to the substrate to form a polymeric layer, they can be covalently bonded to the polymer chains of the polymer(s) used to make up the polymeric layer and/or the substrate surface can be pretreated with coupling agent(s).

The silane used should be chosen based on the type of polymer used to form the polymeric film. Guidance for choosing the coupling agents effective for a particular polymer can be obtained from the two books on the subject listed above and from product catalogs like "Silane, Silicones and Metal-Organics" available from Gelest Inc. of Tullytown, Pa. or "Silicon Compounds, Register and Review" available from United Chemical Technologies in Bristol, Pa. Coupling agents suitable for addition to the polymer solutions are monomeric silanes like ureidopropyltriethoxysilane, N-phenylaminopropyltrimethoxysilane, aminopropylsilanetriol, N-(2-aminoethyl)-3-propylmethyltrimethoxysilane and bis(3-trimethoxysilylpropyl)amine. These coupling agents are simply dissolved in the solvent system along with the appropriate polymer and other constituents like UV absorbers, thermochromic materials and/or static light energy absorbing materials. This solution is then applied to the substrate, the solvent allowed to evaporate and a film with improved adhesion is thus formed.

A coupling agent can be covalently bonded to the polymer chain by for instance copolymerization of methacryloxypropyltrimethoxysilane with methylmethacrylate in an inert solvent using a free radical initiator or by reacting 3-isocyanatopropyltriethoxysilane with a polyol like polyvinylalcohol, poly(2-hydroxyethylmethacrylate) or a copolymer of 2-hydroxyethylmethacrylate and methylmethacrylate. Commercially available polymers containing active alkoxysilane groups like trimethoxysilylpropyl (polyethenimine) and trimethoxysilyl modified polyethylene both available from Gelest Inc. of Tullytown, Pa., can be used. The polymers, with silane groups bonded into the polymer chain, can be used as the only polymer in the polymeric layer or can be part of a miscible or immiscible polymer blend that forms the polymer layer. For example the reaction product of 3-isocyanatopropyltriethoxysilane with a copolymer of 2-hydroxyethylmethacrylate and methylmethacrylate can be dissolved in a solvent system with polymethylmethacrylate and, for instance, a UV absorber like 2-ethylhexyl 2-cyano-3,3-diphenylacrylate. When this solution is applied to a glass substrate, and the solvent(s) allowed to evaporate, a UV barrier film with excellent adhesion is formed.

Pretreatment of a substrate to promote adhesion is well described in the art and usually involves partial or complete hydrolysis of the alkoxy groups on the coupling agent in an aqueous/alcohol solution of the coupling agent, (made weakly acidic for non-amino silanes), followed by immersion of the substrate in the solution or application of the solution to the substrate. The substrate can be rinsed with alcohol and dried. The coupling agent should be appropriate for the polymer to be used and can be either monomeric or polymeric. Suitable coupling agents include the monomeric silanes listed above and the polymeric silanes trimethoxysilylpropyl(polyethenimine) and trimethoxysilyl modified polyethylene. The polymer based barrier and/or thermochromic films formed on the pretreated substrate surfaces have dramatically improved adhesion to the substrate.

Low Emissivity Coatings

Low emissivity (low-e) coatings can be combined with light energy absorbing thermochromic layers to provide a window structure that is a more efficient heat barrier than such a window without a low-e coating. This combination is a significant aspect of the present invention. A low-e coating or layer can be on the thermochromic layer or a layer contiguous to it. Alternatively a low-e layer may be located across the space from the thermochromic layer in a window structure that involves two or more spaced apart substrates. Alternatively a low-e layer may be provided on the side of a substrate opposite the thermochromic layer.

An advantageous and preferred structure for a thermochromic window of the invention is described in detail below. Many other structures are possible, but this one serves to illustrate the advantage of incorporating a low-e coating in the window structure.

In a double pane, (double substrate), or insulated window structure, there is a space between two substrates, the thermochromic layer would preferably be located on the substrate that is on the outside, (i.e. in contact with the outdoors) and preferably on the side of the substrate in contact with the space between the substrates. A low-e coating could be provided on the thermochromic layer, however, if there is only one low-e layer present it is preferably located on the other substrate, (i.e. the one in contact with the indoors), and preferably on the side of that substrate in contact with the space between the substrates. Thus, in the preferred case, the thermochromic layer and the low-e layer would face each other across the space.

When a thermochromic layer of a window of this invention is in an insulated window structure and is in direct sunlight on a warm or hot day it is in its more light energy absorbing condition. The light energy absorbed is preferably converted exclusively to heat and the thermochromic layer is at an elevated temperature. The heat energy in the thermochromic layer is transferred from the layer to the surroundings by conduction, convection and radiation, (emission of long wavelength infrared light). In a double pane, insulated window structure with coatings in the preferred locations described above, some of the heat in the thermochromic layer is transferred through any other coatings that are present, to the outside of the substrate that the thermochromic layer is coated on and from there the heat is conducted, convected and radiated to the outdoors. Some of the heat is conducted, either directly or through any over coating(s) that are present, to the space between the substrates and from there the heat can be conducted by normal conduction and by convection of any gas present in the space to the other substrate. The heat conducted by normal conduction (i.e. due to the kinetic energy of the random motion of the gas atoms or molecules), can be minimized by having a partial vacuum in the space or by choosing a gas for the space with poor thermal A conductivity such as carbon dioxide, sulfur hexafluoride, argon, krypton or xenon. Beat conduction by convection of gas in the space can be minimized by the choice of a gas with high kinematic viscosity and the proper, convection minimizing spacing between the substrates.

However a major heat transfer mechanism remains via black body type radiation from the hot thermochromic layer or overcoat, if present, to the inside substrate and from there to the inside of the building or vehicle. In general, low-e coatings are not only poor radiators of long wavelength infrared light they are good reflectors of this light. Thus the radiation emitted from the hot layer(s) on inner side of the outside substrate are reflected back to the outside substrate by a low-e coating on the inner side of the inside substrate. At the outside substrate the reflected radiation is reabsorbed and at least a significant portion is ultimately transferred to the outdoor environment. In this manner the combination of a low-e coating and a colored thermochromic layer act as a substantial barrier to heat from direct solar radiation incident on a window of the invention thus reducing heat build-up in a building, structure or vehicle on a hot, sunny day.

The use of krypton as the gas between the substrates of double pane or insulated glass type thermochromic window structures is particularly advantageous. Krypton has less than half the thermal conductivity of argon or air and is thus a poor conductor of heat by normal conduction. However, krypton has a significantly lower kinematic viscosity than argon or air and thus is more prone to conducting heat by convection. The optimum, heat transfer minimizing spacing between panes in a double pane window with krypton in the spacing is about half the optimum spacing for argon or air. This smaller spacing means that there is less gas in the space and the overall expansion. of gas as it heats up is significantly less with krypton at it optimum spacing simply because there is less gas present. This is very important for thermochromic windows which become very hot in there use as energy absorbing and blocking windows since too much expansion of the gas can place damaging stress on the seals holding the windows panes together and even result in breaking of the window substrates themselves.

Other structures are possible for this combination of coatings, for example one in which the low-e coating is an overcoat of the thermochromic layer of a double pane window. In this case the poor or low rate of emission of infrared radiation of the low-e coating minimizes radiative heat transfer from the outside substrate to the inside substrate. Another possibility is for low-e coatings to be located both on the outside and inside substrates of double pane window structure. A detailed discussion of low-e coatings and window design with low-e coatings is given by T. E. Johnson in "Low E Glazing Design Guide", Butterworth and Heinemann (1991).

Preferred low-e coatings or layers are stacks of thin layers of metal oxides alternated with thin, transparent layers of metal. For example, a thin transparent layer of silver between two thin, transparent layers of zinc oxide to antireflect the silver layer give a high light transmission low-e layer with an emissivity as low as about 0.1. Also preferred are thin layers of degenerately doped metal oxide semiconductors such as fluorine doped tin oxide and tin doped indium oxide. These metal oxide coatings can be color suppressed by one or more undercoating and can easily achieve an emissivity of less than 0.2. Low-e coatings with an emissivity of less than 0.2 are preferred. Examples of commercially available low-e coated glass suitable for use in the present invention are TEC 15 and Energy Advantage® Low-E available from Pilkington-Libbey Owens Ford of Toledo, Ohio; LoË-178 and LoE² available from Cardinal Glass of Spring Green, Wis.; Comfort E and Comfort E2 available from AFG Industries, Inc. of Kingsport, Tenn. and Sungate®100, Sungate®500 and Sungate®1000 available from PPG Industries, Inc. of Pittsburgh, Pa. An example of a preferred low-e coated plastic is Solis® polyester films available from Southwall Technologies of Palo Alto, Calif.

The transmission spectrum of a piece of TEC 15 glass is shown as curve 1 of FIG. 4. The decrease in transmission at wavelengths longer than about 1400 nanometers shown in FIG. 4 is mostly due to an increase in NIR light reflectance at these longer wavelengths.

Device Control

In many of embodiments of this invention, the devices of this invention spontaneously change to provide energy blocking under the appropriate conditions of temperature and directness of sunlight without control mechanisms and user intervention. Other embodiments of this invention provide devices that can be controlled by users or be controlled automatically by, for example, electronic control mechanisms, if so desired. Controllable dimming is achieved by providing a means of heating the thermochromic layer such as a transparent conducting layer in thermal contact with the thermochromic layer and a source of electricity to resistively heat the transparent conducting layer and thereby the thermochromic layer. The amount of electrical energy provided to the transparent conductor can be user controlled by for example the use of a rheostat or it can be controlled by an electronic circuit that takes into account such things as the time of day, the orientation of the sun or the outdoor, ambient temperature. If a low-e layer is provided on the thermochromic layer or any overcoating(s) present, the low-e layer can serve as a resistive heater layer when desired and provide low emissivity character when the resistive heating is not in use. This may be useful for a window that would spontaneously block solar heat build-up on warm summer days and be user controlled to block solar heat build-up on sunny winter days.

Window Structures

The devices of the invention which are windows can have a number of different structures depending on the type of window, the location and orientation in the building or vehicle and the climate conditions in the region the window is used. Installation into building and/or vehicle is typically by means of standard technologies like frameworks, mullions and molded plastic strips on the glass for adhesion to the window frame. FIG. 1 illustrates several of the novel structures possible with the unique combination of layers described in the invention. FIG. 1 is illustrative of the structures possible for the windows of the invention and is not meant to be an exhaustive list of possible structures.

FIG. 1*a* shows a window structure 10 which is comprised of a substrate 20 which is in contact with a barrier layer 30 which, in turn, is in contact with a static light energy absorbing layer 40 which, in turn, is in contact with a thermochromic layer 50 which, in turn, is in contact with a protective overcoat layer 60 which, in turn, is in contact with a low-e layer 70. In FIG. 1*a* the barrier layer and the static light energy absorbing layer may comprise a single layer with properties of both layers. Alternatively, the static light energy absorbing layer and the thermochromic layer may comprise a single layer with properties of both layers. The window structure in 1*a* is intended to be installed in a building or vehicle with the substrate 20 facing the outside or the sun and the low-e layer 70 facing the inside.

Figure 1B:
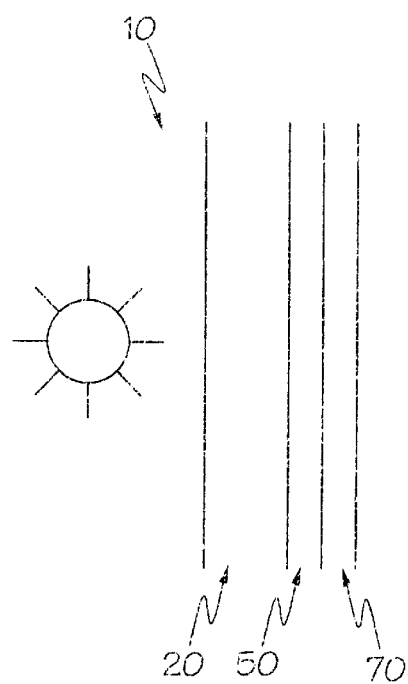

FIG. 1*b* shows an alternative structure 10 comprised of a substrate 20 which is in contact a thermochromic layer 50 which, in turn, is in contact with a low-e layer 70. In FIG. 1*b*, the substrate optionally incorporates barrier properties. The substrate and/or the thermochromic layer optionally incorporate static light energy absorbing properties. The low-e layer optionally incorporates protective overcoat properties. The window structure in 1*b* is intended to be installed in a building or vehicle with the substrate 20 facing the outside or the sun and the low-e layer 70 facing the inside.

Figure 1C:
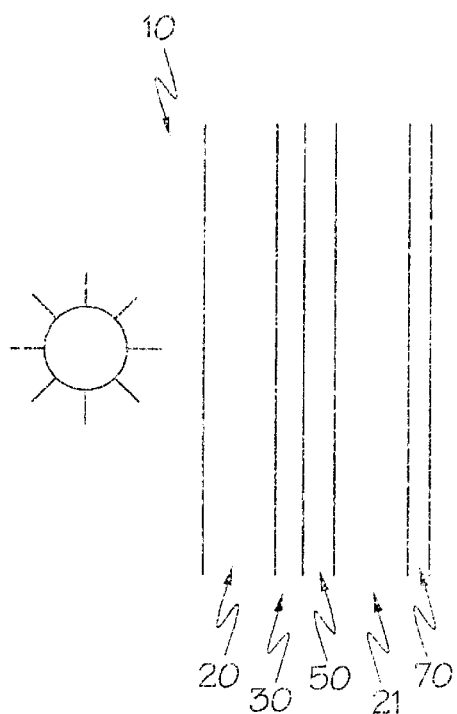

FIG. 1*c* shows an alternative structure 10 comprised of a substrate 20 which is in contact with a barrier layer 30 which, in turn, is in contact with a thermochromic layer 50 which, in turn, is in contact with another substrate 21 which, in turn, is in contact with a low-e layer 70. In FIG. 1*c*, the substrate 20, the substrate 21, the barrier layer and/or the thermochromic layer optionally incorporate static light energy absorbing properties. The window structure in 1*c* is intended to be installed in a building or vehicle with the substrate 20 facing the outside or the sun and the low-e layer 70 facing the inside.

Figure 1D:
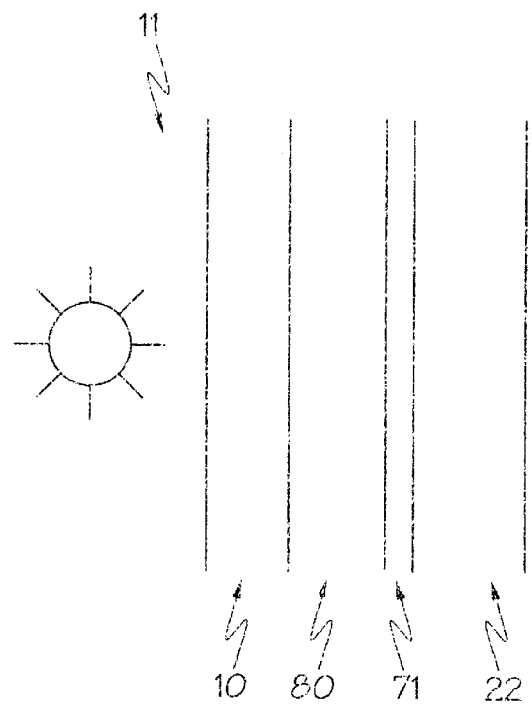

FIG. 1*d* shows an alternative structure 11 in which any one of the structures 10 of FIGS. 1*a*–1*c* is combined with a gas or vacuum space 80 and another substrate 22 which is in contact with a low-e layer 71. In FIG. 1*d*, the low-e layer on structure 10 and the low-e layer in contact with substrate 22 are optional. However it is preferable that one or both of them be present in structure 11. The window structure in 1d is intended to be installed in a building or vehicle with the structure 10 facing the outside or the sun and the substrate 22 facing the inside.

EXAMPLE 1

A thermochromic window is prepared by laminating a piece of glass with short wavelength barrier properties to a piece of glass coated with a low-e layer together with a thermochromic polymer film as the laminating layer. The piece of glass with short wavelength barrier properties is a 495 nanometer cutoff filter glass obtained from Edmund Scientific Company of Barrington, N.J. The piece of glass coated with a low-e layer is a piece of TEC 15 glass available from Pilkington-Libbey Owens Ford of Toledo, Ohio. The thermochromic polymer film layer is prepared from a solution of propylene carbonate containing 0.3 grams of poly(vinyl acetate), (average molecular weight ca. 167, 000), and 0.3 grams of 2-hydroxy-4-methoxy-benzophenone both available from Aldrich Chemical Company Inc. of Milwaukee, Wis., and 10 milligrams of Reversacol Palatenate Purple, (a spirooxazine type compound available from Keystone Aniline Corporation of Chicago, Ill.). Several drops of the viscous solution were spread on the uncoated side of the TEC 15 glass and this solution is allowed to dry in an oven at 60° C. for 20 hours. This film is photochromic in nature in that exposure to sunlight immediately caused the initially medium green film to turn dark greenish/blue. The film is thermochromic in nature in that heating the film from room temperature to 70° C., in the absence of sunlight, caused the film to turn progressively darker bluish/green.

The polymer film thus obtained is tacky and somewhat compliant even after drying so that lamination of the piece of glass with short wavelength barrier properties to the piece of TEC 15 glass is accomplished simply by pressing the barrier glass onto the thermochromic polymer film. The laminated window thus obtained is medium bluish/green in color in the area of the thermochromic layer. No photochromic coloration was observed when the window was exposed to direct sunlight for several minutes with the barrier glass facing the sun and the low-e layer facing away from the sun. On exposure to direct sunlight, with the same orientation to the sun, for an extended period of time, (at least 20 minutes), at an ambient temperature of approximately 31° C. the temperature of the window rose to 53° C. The window in the area of the thermochromic layer changed from medium green to noticeably darker bluish/green in appearance as the temperature rose. Thus the photocoloration of the window was suppressed and the thermal coloration due to the warm ambient temperature and direct sunlight exposure was significant even though there may have been a small amount of photobleaching due to the visible portion of the sunlight.

EXAMPLE 2

A thermochromic window was prepared from a sheet of EverGreen™ glass laminated to a sheet of Energy Advantage® Low-E both available from Pilkington-Libbey Owens Ford of Toledo, Ohio. The pieces of glass were laminated together by solvent casting a film of poly(vinyl acetate), (average molecular weight ca.167,000), 2-hydroxy-4-methoxy-benzophenone both available from Aldrich Chemical Company Inc. of Milwaukee, Wis., and Reversacol Palatenate Purple, (a spirooxazine type compound available from Keystone Aniline Corporation of Chicago, Ill.), from a propylene carbonate solution on one side of the Ever-Green™ glass and on the side of the Energy Advantage® glass opposite the low-e coating. After the propylene carbonate had evaporated, the polymer films were pressed together and heated to form a single uniform film 0.026 centimeters thick.

At a temperature of 23° C. indoors, in normal room light the window was moderately green in color. This window was exposed to sunlight, with the EverGreens™ glass side of the laminate facing the sun and the low-e layer facing away from the sun, on a warm day, (outdoor, ambient temperature 32° C.). The window became darker colored from what was apparently photochromic activity. After several minutes, the sunlight exposure caused the temperature of the window to rise to 35° C. and the window became less colored. After a total of about 20 minutes the temperature of the window rose to 54° C. and the thermochromic Layer had progressively darkened again to a shade of blue/green almost as dark as than that produced initially by the photochromic activity.

With the window at 23° C. and light of wavelengths shorter than about 495 nanometers blocked by placing a cutoff filter over the EverGreen™ glass, no darkening in color was observed on exposure to sunlight because all of the photochromic activity appeared to be suppressed. This was for exposure of the window to sunlight with the cutoff filter facing the sun and the low-e layer facing away from the sun. Further exposure to sunlight caused the window to increase in temperature and coloration as before.

Figure 2:
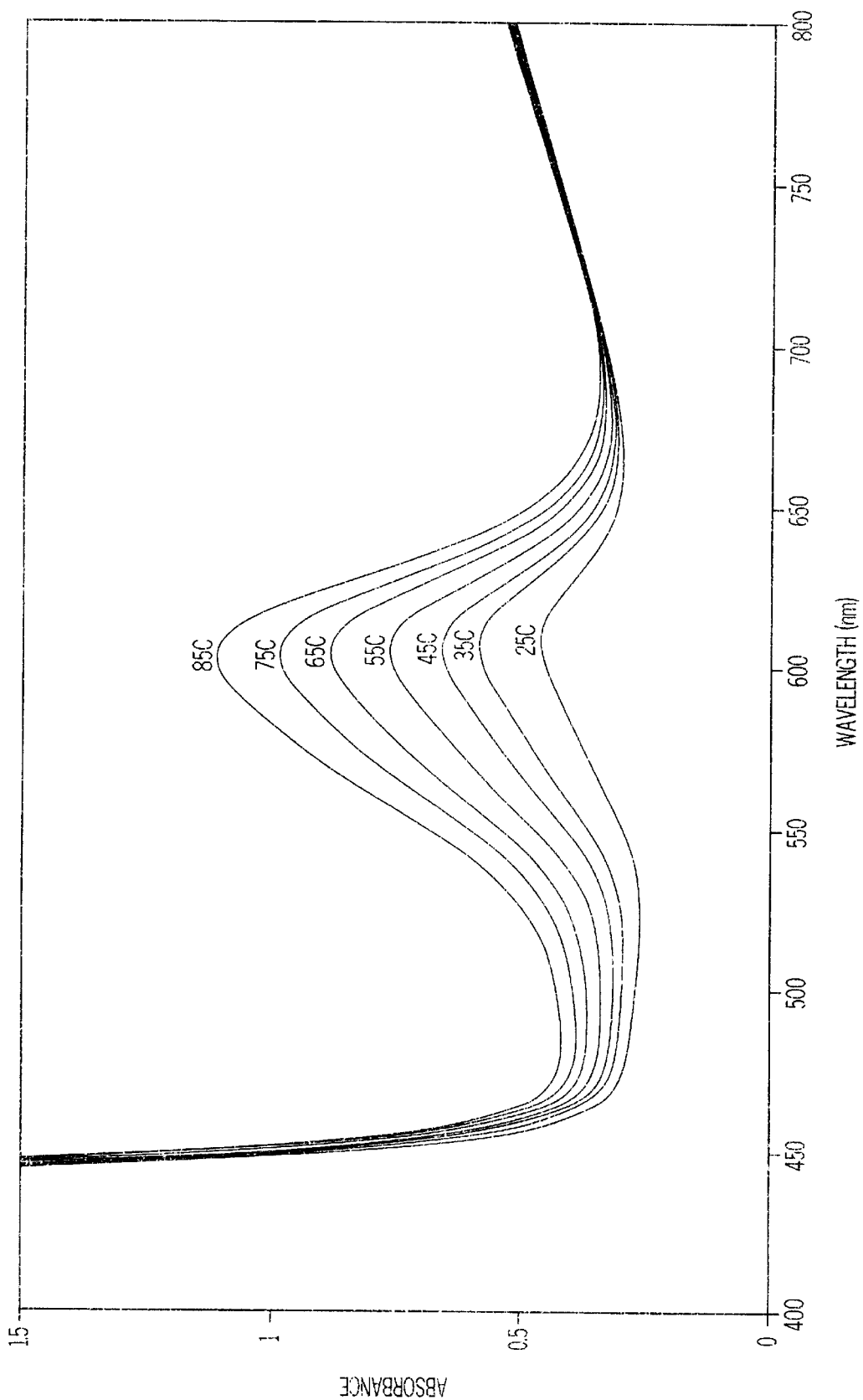
FIG. 2 shows the absorbance of the window of the invention as a function of the temperature of the window constructed in accordance with Example 2.

When the window, (without the cutoff filter), was heated in the sample compartment of a spectrophotometer by passing electric current through the low-e layer, the absorption of the window increased with temperature as shown in FIG. 2. Although the spectra in FIG. 2 were measured with the window in the dark, visual comparison of the darkness of color of the window heated in room light to the darkness of color the window heated by exposure to sunlight showed, remarkably, that little if any visible light induced photobleaching occurred in sunlight for this thermochromic system.

EXAMPLE 3

Figure 3:
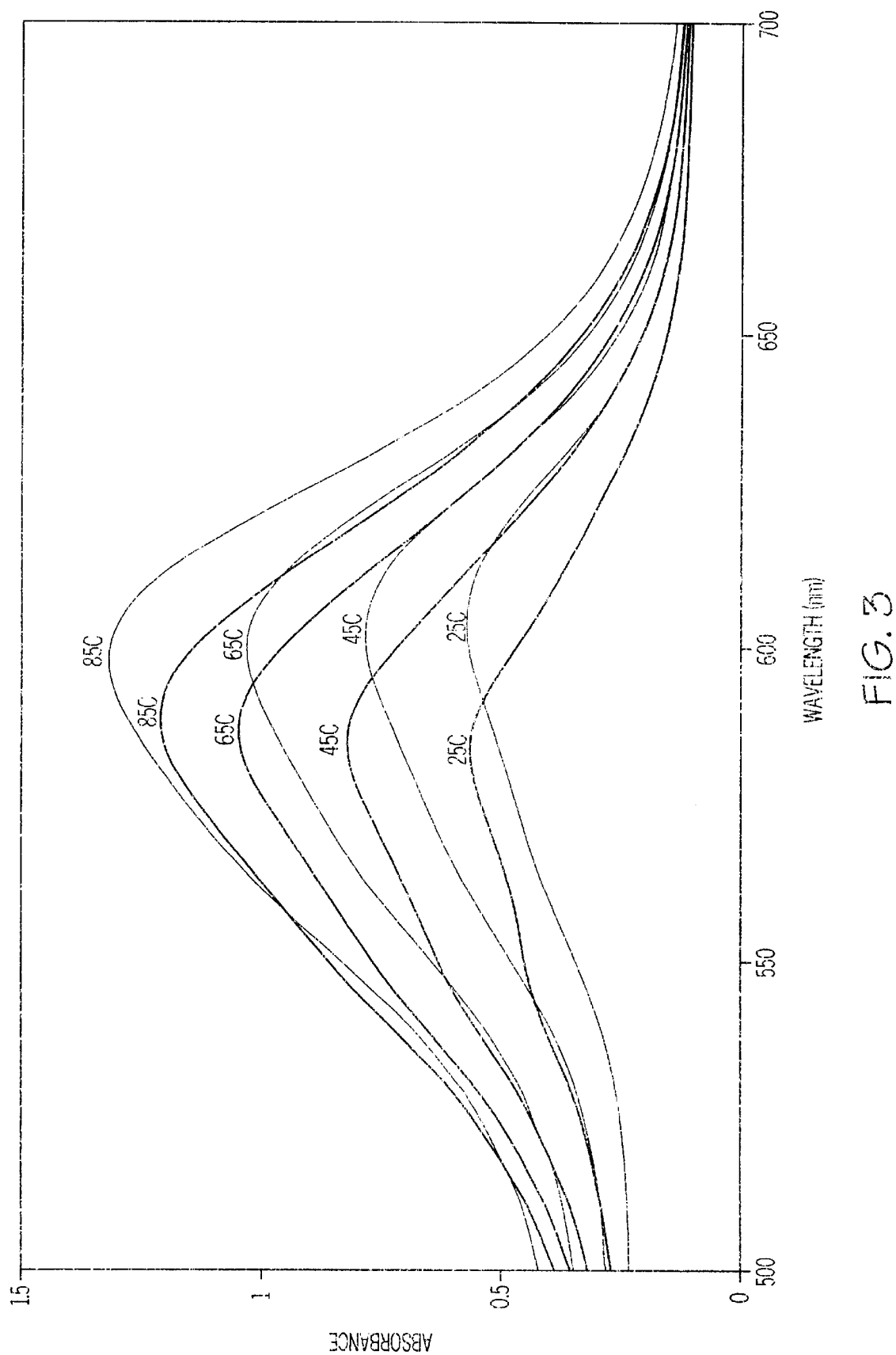
FIG. 3 shows a comparison of the absorption spectra of two types of windows of the invention constructed in accordance with Example 3.

A thermochromic layer was prepared on the uncoated side of a sheet of TEC 15 glass available from Pilkington-Libbey Owens Ford of Toledo, Ohio by spreading several drops of a solution of 0.3 grams poly(vinyl acetate), (average molecular weight ca.167,000), 0.3 grams 2-hydroxy-4-methoxy-benzophenone and 10 milligrams Reversacol Palatenate Purple, (a spirooxazine type compound available from Keystone Aniline Corporation of Chicago, Ill.) dissolved in 0.4 grams of acetone and 0.4 grams of propylene carbonate. The solvents were allowed to evaporate at room temperature for about 1 hour and then at 60° C. for about 16 hours. A slightly tacky, green film about 0.02 centimeters thick was formed. When the glass and the thermochromic layer were heated by passing current through the transparent conducting, low-e layer on the sheet of glass, the thermochromic layer progressively darkened to dark green. The spectra of the thermochromic film on the sheet of glass at 25° C., 45° C., 65° C., and 85° C. are shown by the thin lines in FIG. 3. The spectra at 85° C. is calculated for illuminant $D_{65}$ and a 2 degree observer to have C.I.E. 1976 L*, a* and b* values of 49.4, −26.1 and −3.9 respectively which give rise to $C^*_{ab}$ value of 26.4, (see "Principles of Color Technology, $2^{nd}$ Edition", F. W. Billmeyer Jr. and M. Saltzman, John Wiley and Sons, Inc. (1981) for a discussion of color coordinates).

A thermochromic layer was prepared on the uncoated side of a sheet of TEC 15 glass available from Pilkington-Libbey Owens Ford of Toledo, Ohio by spreading several drops of a solution of 0.3 grams poly(vinyl acetate), (average molecular weight ca.167,000), 0.3 grams 2-hydroxy-4-methoxy-benzophenone, about 5 milligrams Reversacol Palatenate Purple, (a spirooxazine type compound available from Keystone Aniline Corporation of Chicago, Ill.), about 5 milligrams of 1',3'-dihydro-1',3',3'-trimethyl-5'-methoxy-6-nitrospiro[2H-1-benzopyran-2,2'-(2H)-indole], (Chroma Dye 88 available from Chroma Chemicals Inc. of Dayton, Ohio), dissolved in 0.7 grams of propylene carbonate. The solvent was allowed to evaporate at 60° C. for about 16 hours. A slightly tacky, grayish/reddish/brown film about 0.02 centimeters thick was formed. When the glass and the thermochromic layer were heated by passing current through the transparent conducting, low-e layer on the sheet of glass, the thermochromic layer progressively darkened to quite dark bluish/gray. The spectra of the thermochromic film on the sheet of glass at 25° C., 45° C., 65° C., and 85° C. are shown by the thick lines in FIG. 3. The spectra at 85° C. is calculated for illuminant $D_{65}$ and a 2 degree observer to have C.I.E. 1976 L*, a* and b* values of 50.7, −12.7 and −11.0 respectively which gives rise to $C^*_{ab}$ value of 16.8, which is significantly smaller than the $C^*_{ab}$ of 26.4 for the film with Reversacol Palatenate Purple as the only thermochromic material. This means that the combination of thermochromic materials gives a film with a color that is lower in chroma and is duller or more gray in color. A film prepared with Chroma Dye 88 as the only thermochromic materials turns dark reddish/brown on heating and also appears less gray in color than the film with the combination of thermochromic materials.

EXAMPLE 4

A thermochromic layer was prepared by solvent casting a film from a solution of 0.24 weight % crystal violet lactone and 4.7 weight % poly(vinyl butyral-co-vinyl alcohol-co-vinyl acetate), (88% vinyl butyral, average molecular weight 50,000 to 80,000) both available from Aldrich Chemical Company Inc. of Milwaukee, Wis. and 0.47 weight % octadecylphosphonic acid available from Alfa Aesar of Ward Hill, Mass. dissolved in an equal weight mixture of ethyl acetate and amyl acetate on a piece of TEC 15 glass. After evaporation of the solvents the film composition was about 5 weight % crystal violet lactone and 10 weight % octadecylphosphonic acid in the poly(vinyl butyral-co-vinyl alcohol-co-vinyl acetate) polymer matrix. As prepared, the film was 0.02 centimeters thick and was nearly colorless but somewhat hazy or light scattering at 25° C. On heating to 50° C. the film turned clear and bright blue in color.

EXAMPLE 5

A UV barrier layer was prepared on a 0.1 centimeter thick piece of glass by solvent casting a 0.02 centimeter thick layer which was 33 weight % 2-hydroxy-4-octyloxybenzophenone in poly(vinyl butyral-co-vinyl alcohol-co-vinyl acetate), (88% vinyl butyral, average molecular weight 50,000 to 80,000). The solvents used were ethyl acetate and amyl acetate. Both the benzophenone and the butyral copolymer were obtained from Aldrich Chemical Company Inc. of Milwaukee, Wis. The transmission spectrum of this barrier layer on the piece of glass after evaporation of the solvents is shown as curve 3 in FIG. 4.

EXAMPLE 6

A barrier to UV and SWV light was prepared on a 0.1 centimeter thick piece of glass by solvent casting a 0.02 centimeter thick layer which was 17 weight % 2-hydroxy-4-octyloxybenzophenone and 5 weight % quinoline yellow in poly(vinyl butyral-co-vinyl alcohol-co-vinyl acetate), (88% vinyl butyral, average molecular weight 50,000 to 80,000). The solvents used were ethyl acetate and amyl acetate. The 2-hydroxy-4-octyloxybenzophenone, quinoline yellow and the butyral copolymer were obtained from Aldrich Chemical Company Inc. of Milwaukee, Wis. The transmission spectrum of this barrier layer on the piece of glass after evaporation of the solvents is shown as curve 4 of FIG. 4.

EXAMPLE 7

A thermochromic device suitable for use as a window or a shutter was prepared by solvent casting a film that was 9.4 weight % Reversacol Sea Green, 45.3 weight % 2-hydroxy-4-octyloxybenzophenone (a UV stabilizer) and 45.3 weight % poly(vinyl butyral-co-vinyl alcohol-co-vinyl acetate), (88% vinyl butyral, average molecular weight 50,000 to 80,000) from a solution of these materials in 50/50 mixture ethyl acetate and amyl acetate on a piece of TEC 15 glass. The high content of 2-hydroxy-4-octyloxybenzophenone appeared to plasticize the film making it easy to laminate a piece of clear window glass to the TEC 15 glass after the solvents had evaporated. By applying pressure at 60° C., thermochromic polymer film was pressed out to a uniform 0.025 centimeter thick film between the two pieces of glass, by using 0.025 centimeter thick nylon mono-filament spacers between the pieces of glass. It is believed that both the poly(vinyl butyral-co-vinyl alcohol-co-vinyl acetate) and the 2-hydroxy-4-octyloxbenzophenone provide an environment particularly suitable for thermochromic activity of the Reversacol Sea Green. The piece of TEC 15 glass was larger than the piece of window glass on two opposite sides so that electrical contact could be made on either side of the transparent conductive coating on the TEC 15 glass with electrically conductive, spring loaded, paper clips. A variable voltage alternating current power supply was connected to the clips and the window or shutter was heated to and controlled at various temperatures by applying various amounts of power to the device. The optical properties of the device were measured in a spectrophotometer at a series of temperatures and the measured properties and those calculated from the resulting spectra are shown Below:

| Temperature C. | $\lambda_{max}$ | Absorbance at $\lambda_{max}$ | White Light % T |
|---|---|---|---|
| 25 | 631 | 0.7 | 38.7 |
| 35 | 628 | 1.01 | 29.2 |
| 45 | 627 | 1.44 | 20.2 |
| 55 | 624 | 1.83 | 14.8 |
| 65 | 619 | 2.26 | 10.7 |
| 75 | 622 | 2.85 | 7.0 |
| 85 | 617 | 3.24 | 5.1. |

Even though the device starts out with a transmission at $\lambda_{max}$ of only about 20% at 25° C. its transmission at $\lambda_{max}$ decreases over the range of 25° to 85° C. to about 0.06% for an impressive change of over 330 to 1 in this wavelength range.

Conceptual Example 1

A 0.6 centimeter wide aluminum double pane window spacer is bonded to the low-e layer side of the window of Example 2 and the 495 nanometer cutoff filter is bonded to the EverGreen™ glass side of the laminate. A second sheet of Energy Advantage® Low-E available from Pilkington-Libbey Owens Ford of Toledo, Ohio is bonded to the other side of the aluminum double pane window spacer, with the low-e coating facing inward toward the first low-e layer. A desiccant is placed in the aluminum spacer and the space between the panes of glass is filled with krypton gas. The window is glazed into a building structure with the following orientation starting from the outside, sunlight exposure side: 495 nanometer cutoff filter glass, EverGreen™ glass, thermochromic layer, Energy Advantage® glass, low-e layer of Energy Advantage® glass, krypton gas, low-e layer of Energy Advantage® glass, Energy Advantage® glass, inside of building. This window system should allow substantial solar radiation into the building under conditions where the sunlight is not direct and/or the outdoor temperature is cool since very little darkening of the thermochromic layer should take place under these conditions. This window system should provide substantial solar energy blocking when the sunlight is directly on the window especially on warm days since the thermochromic layer should darken significantly under these conditions. Even on warm days the heat transfer due to the gas in the space and the thermal expansion of the window system due to expansion of the gas should be minimized due to a thin spacing between the panes and the use of krypton gas in the spacing.

Conceptual Example 2

A thermochromic window is prepared from a sheet of Evergreen™ glass available from Piikington-Libbey Owens Ford of Toledo, Ohio laminated to a sheet of LoE$^2$ available from Cardinal Glass of Spring Green, Wis. The sheet of EverGreen™ glass is coated on one side, over an area of 900 square centimeters, with a solution of 20 grams polyvinyl butyral-co-vinyl alcohol-co-vinyl acetate), (88% vinyl butyral, average molecular weight 50,000 to 80,000), and 5 grains of 2-hydroxy4-octyloxybenzophenone in 50 milliliters of amylacetate and 50 milliliters of ethylacetate. The sheet of LoE$^2$ is coated on the side opposite the low-e coating, over an area of 900 square centimeters, with a solution of 20 grams of poly(vinyl butyral-co-vinyl alcohol-co-vinyl acetate), (88% vinyl butyral, average molecular weight 50,000 to 80,000), 5 grams of 2-hydroxy4-octyloxybenzophenone and 1 gram of Reversacol Aqua Green in 50 milliliters of amylacetate and 50 milliliters of ethylacetate. The solvent is allowed to evaporate from the solutions to form a barrier layer on the sheet of EverGreen™ glass and a thermochromic layer on the sheet of LoE$^2$ glass. The two pieces of glass, with the polymer layers facing each other, are fed together through a set of heated pinch rollers and subsequently heated to about 90° C. for 20 minutes. The lamination process is completed in an autoclave procedure like that used for laminating automotive windshields. This window is glazed into a building with the EverGreen™ glass facing the outside, sun exposure side of the building and the low-e layer of the LoE$^2$ glass facing the inside of the building.

With an outdoor temperature of 34° C. and clear, sunny conditions, when the window is exposed to direct sunlight from the side of the EverGreen™ glass, the exposure of the window should cause it to change from medium green to slightly darker green from what is believed to be a small amount of residual photochromic activity. On continued exposure the window should increase in temperature and became progressively darker green in appearance.

With an outdoor temperature of 14° C. and clear, sunny conditions, when the window is exposed to direct sunlight from the side of the EverGreen™ glass, a slight amount of tinting may be observed. Prolonged exposure should only cause a modest increase in the temperature of the window and very little increase in coloration.

Conceptual Example 3

A window is prepared by coating a 1 mm thick glass substrate with a barrier layer, a static light energy absorbing layer, a thermochromic layer and a protective overcoat layer. Prior to coating the glass with these layers, it is pretreated by dipping the glass in a 90% isopropyl alcohol and 10% water solution containing 3 weight percent trimethoxysilylpropyl (polyethenimine) for 5 minutes, followed by rinsing the glass with isopropyl alcohol and allowing it to dry.

The barrier layer for both UV and SWV light is prepared by dissolving 20 grams of polymethylmethacrylate, (average molecular weight ca. 996,000), 2 grams of quinoline yellow, (Solvent Yellow 33, C.I. 47000) and 5 grams of 2-hydroxy-4-octyloxybenzophenone in 14 grams of acetone and 6 grams of propylene carbonate. The solution is evenly spread on the glass substrate over an area of approximately 1000 square centimeters. The solvents are allowed to evaporate at room temperature for 2 hours and in an oven at 60° C. for 16 hours, whereupon a tack free layer with excellent UV and SWV barrier properties can be obtained.

The static, light energy absorbing layer is prepared by dissolving 20 grams of polymethylmethacrylate, (average molecular weight ca. 996,000), 5 grams of 2-hydroxy-4-octyloxybenzophenone and 1 grams of 4,6-dinitro4'-methyl-2,2'-azodiphenol, (Mordant Brown 6, C.I. 11875) in 14 grams of acetone and 6 grams of propylene carbonate. The solution is evenly spread on the barrier layer over the area of approximately 1000 square centimeters. The solvents are allowed to evaporate at room temperature for 2 hours and in an oven at 60° C. for 16 hours, whereupon a tack free static light energy absorbing layer can be obtained.

The themochromic layer is prepared by dissolving 20 grams of polymethylmethacrylate, (average molecular weight ca. 996,000), 5 grams of 2-hydroxy-4-octyloxybenzophenone and 0.5 grams of Reversacol Sea Green, (a spirooxazine type compound available from Keystone Aniline Corporation of Chicago, Ill.), in 14 grams of acetone and 6 grams of propylene carbonate. The solution is evenly spread on the static light energy absorbing layer over the area of approximately 1000 square centimeters. The solvents are allowed to evaporate at room temperature for 2 hours and in an oven at 60° C. for 16 hours, whereupon a tack free thermochromic layer can be obtained.

The protective overcoat layer is prepared by dissolving 20 grams of polymethylmethacrylate, (average molecular weight ca. 996,000), and 2 grams of 2,6-di-tert-butyl-4-methylphenol in 14 grams of acetone and 6 grams of propylene carbonate. The solution is evenly spread on the thermochromic layer over the area of approximately 1000 square centimeters. The solvents are allowed to evaporate at room temperature for 2 hours and in an oven at 60° C. for 16 hours, whereupon a tack free protective overcoat layer can be obtained.

Exposure of the window to sunlight on a cold day should cause no observable photocoloration and very little warming of the window and very little thermocoloration. Exposure of the window to sunlight on a hot day should not cause observable photocoloration but result in significant warming of the window and significant thermocoloration.

When the thermochromic window is glazed into a double pane window with the polymer layers facing the inward side of the frame, the other pane is a sheet of Sungate® available from PPG Industries, Inc. of Pittsburgh, Pa. with the low-e coating facing the inward side of the frame. The window should provide increased energy efficiency as compared to normal double pane windows when installed in a building with the 1 mm piece of glass facing the outside, followed by the polymer layers, the gas space, the low-e layer and Sungate® glass with the uncoated side Sungate® glass facing the inside of the building.

Conceptual Example 4

A thermochromic layer that is proposed to be retrofitted to existing windows can be prepared by coating a sheet of Solis® polyester film available from Southwall Technologies of Palo Alto, Calif. with a thermochromic layer and a contact adhesive layer with barrier properties. The Solis® film can be coated on the side opposite the side already coated with the low-e coating by spreading a solution of poly(vinyl acetate), (average molecular weight ca.167,000), Keysorb 1026, bis(1,2,2,6,6-pentamethyl-4-piperidinyl) (3,5-di-tertbutyl-4-hydroxybenzyl)butylpropanedioate and the Reversacol Palatenate Purple in toluene on the polyester film and allowing the toluene to evaporate. This thermochromic layer is over coated by spraying on a dispersion of the UV absorber Tinuvin® 213 available from Ciba Specialty Chemicals of Tarrytown, N.Y. in the contact adhesive Fastbond™ 30-NF available from 3M Company of St. Paul, Minn.

After the contact adhesive layer had dried, pieces of the film are bonded to the underside of the glass of the sunroof and interior side of the side and back windows on the inside of a car. The thermochromic layer, in conjunction with the low-e layer on the other side of the polyester film, should be effective in minimizing heat build-up in the car, particularly when the car is parked in direct sunlight on a warm or hot day.

Another piece of this retrofit thermochromic film is adhered to the indoor side of the inside pane of a double pane, insulated glass window structure. In this configuration the thermochromic layer in conjunction with the low emissivity character should provide a barrier to heat build-up from direct sunlight.

Having described the invention in detail and by reference to specific embodiments thereof it will be apparent that numerous variations and modifications thereof are possible without departing from the spirit and scope of the invention as defined by the following claims.

What is claimed is:

1. A thermochromic device comprising:
    a light transmitting substrate;
    at least one thermochromic material which changes reversibly from less light energy absorbing to more light energy absorbing as its temperature increases; and
    at least one material with static light energy absorbing character;
    wherein the thermochromic material is present in the substrate or in a layer carried on the substrate at a level of from 0.1 weight % to 20 weight % of the substrate or the layer, and the material with static light energy absorbing character may be present in the same layer or in a different layer than the thermochromic material.

2. The thermochromic device of claim 1 wherein the thermochromic material is in a layer with a thickness from 0.001 centimeters to 0.1 centimeters.

3. The thermochromic device of claim 1 wherein the substrate provides static light energy absorbing character.

4. The thermochromic device of claim 1 wherein a thermochromic material provides residual light energy absorbing character.

5. The thermochromic device of claim 1 wherein the material(s) with static light energy absorbing character absorbs 5 percent or more of the sunlight incident on the device.

6. The thermochromic device of claim 1 wherein the material(s) with static light energy absorbing character absorbs 10 percent or more of the sunlight incident on the device.

7. The thermochromic device of claim 1 wherein the material(s) with static light energy absorbing character absorbs sufficient sunlight energy to cause a 10 ° C. or more temperature increase in the thermochromic material(s) when the device is exposed to full sunlight.

8. The thermochromic device of claim 1 wherein the material(s) with static light energy absorbing character absorbs sufficient sunlight energy to cause a 20° C. or more temperature increase in the thermochromic material(s) when the device is exposed to full sunlight.

9. The thermochromic device of claim 1 wherein the thermochromic material(s) varies continuously from less light energy absorbing to more light energy absorbing over the temperature range from 25° C. to 85° C.

10. The thermochromic device of claim 1 wherein a thermochromic material(s) is a spiropyran, a spirooxazine or a chromene.

11. The thermochromic device of claim 1 wherein the chroma of the device in full sunlight has a $C^*_{ab}$ value of less than 20.

12. The thermochromic device of claim 1 wherein the device includes a barrier to UV light positioned between a source of UV light and the thermochromic material(s).

13. The thermochromic device of claim 12 wherein the device includes a low-e layer.

14. The thermochromic device of claim 1 wherein the device includes a barrier to UV light and SWV light positioned between a source of UV light and SWV light and the thermochromic material(s).

15. The thermochromic device of claim 1 wherein the device includes a low-e layer wherein the low-e layer is positioned with respect to the thermochromic material(s) such that said thermochromic material(s) resides between the low-e layer and the incident sunlight.

16. The thermochromic device of claim 1 wherein the substrate is tempered, toughened or strengthened glass.

17. The thermochromic device of claim 1 wherein the substrate has a non-infinite radius of curvature.

18. The thermochromic device of claim 1 wherein the substrate is provided with an edge treatment.

19. The thermochromic device of claim 1 wherein the device includes an adhesion promoter.

20. The thermochromic device of claim 1 wherein the device includes an antioxidant.

21. The thermochromic device of claim 1 wherein the device includes a heat stabilizer.

22. The thermochromic device of claim 1 wherein the device includes a plasticizer.

23. The thermochromic device of claim 1 wherein the device includes a light stabilizer.

24. The thermochromic device of claim 1 wherein the device includes one or more additional substrates.

25. The thermochromic device of claim 24 wherein the substrates are in a spaced apart relationship.

26. The thermochromic device of claim 25 wherein the space or spaces between the substrates are evacuated.

27. The thermochromic device of claim 25 wherein the space or spaces between the substrates are filled with gas.

28. The thermochromic device of claim 27 wherein the gas includes krypton.

29. The thermochromic device of claim 1 wherein the thermochromic material(s) is present in a substrate or in a layer which comprises a polyurethane.

30. The thermochromic device of claim 1 wherein the device includes an overcoating layer positioned between a source of environmental contamination and the thermochromic material(s).

31. The thermochromic device of claim 1 wherein the device includes a material that changes from less reflecting to more reflecting of NIR light as the temperature of said material is increased.

32. The thermochromic device of claim 24 wherein the device includes a low-e layer.

33. The thermochromic device of claim 24 wherein the device includes a UV barrier.

34. The thermochromic device of claim 32 wherein the device includes a UV barrier.

35. The thermochromic device of claim 1 wherein the substrate is a NIR light absorbing glass.

36. The thermochromic device of claim 1 wherein the substrate is tinted glass.

37. The thermochromic device of claim 1 wherein the substrate is glass formed into sheets by the drawn sheet process or the floatline process.

38. The thermochromic device of claim 1 wherein the substrate exhibits light transmission characteristics in conformance with the light transmission characteristics shown in curve 2 of FIG. 4.

39. A thermochromic device comprising:
a light transmitting substrate; and
at least one thermochromic material which changes reversibly from less light energy absorbing to more light energy absorbing as its temperature increases;
wherein the absorbance of said thermochromic material is continuously variable over a wide range of temperatures.

40. The thermochromic device of claim 39 wherein the device comprises at least one material with static light energy absorbing character.

41. The thermochromic device of claim 39 wherein the substrate comprises at least one material with static light energy absorbing character.

42. The thermochromic device of claim 39 wherein a thermochromic material provides residual light energy absorbing character.

43. The thermochromic device of claim 40 wherein the material(s) with static light energy absorbing character absorbs 5 percent or more of the sunlight incident on the device.

44. The thermochromic device of claim 40 wherein the material(s) with static light energy absorbing character absorbs 10 percent or more of the sunlight incident on the device.

45. The thermochromic device of claim 40 wherein the material(s) with static light energy absorbing character absorbs sufficient sunlight energy to cause a 10° C. or more temperature increase in the thermochromic material(s) when the device is exposed to full sunlight.

46. The thermochromic device of claim 40 wherein the material(s) with static light energy absorbing character absorbs sufficient sunlight energy to cause a 20° C. or more temperature increase in the thermochromic material(s) when the device is exposed to full sunlight.

47. The thermochromic device of claim 39 wherein the thermochromic material(s) varies continuously from less light energy absorbing to more light energy absorbing throughout the temperature range from 30° C. to 90° C.

48. The thermochromic device of claim 39 wherein a thermochromic material(s) is a spiropyran, a spirooxazine or a chromene.

49. The thermochromic device of claim 39 wherein the chroma of the device in full sunlight has a $C^*_{ab}$ value of less than 20.

50. The thermochromic device of claim 39 wherein the device includes a barrier to UV light positioned between a source of UV light and the thermochromic material(s).

51. The thermochromic device of claim 50 wherein the device includes a low-e layer.

52. The thermochromic device of claim 39 wherein the device includes a barrier to UV light and SWV light positioned between a source of UV light and SWV light and the thermochromic material(s).

53. The thermochromic device of claim 39 wherein the device includes a low-e layer wherein the low-e layer is positioned with respect to the thermochromic material(s) such that said thermochromic material(s) resides between the low-e layer and the incident sunlight.

54. The thermochromic device of claim 39 wherein the substrate is tempered, toughened or strengthened glass.

55. The thermochromic device of claim 39 wherein the substrate has a non-infinite radius of curvature.

56. The thermochromic device of claim 39 wherein the substrate is provided with an edge treatment.

57. The thermochromic device of claim 39 wherein the device includes an adhesion promoter.

58. The thermochromic device of claim 39 wherein the device includes an antioxidant.

59. The thermochromic device of claim 39 wherein the device includes a heat stabilizer.

60. The thermochromic device of claim 39 wherein the device includes a plasticizer.

61. The thermochromic device of claim 39 wherein the device includes a light stabilizer.

62. The thermochromic device of claim 39 wherein the device includes one or more additional substrates.

63. The thermochromic device of claim 62 wherein the substrates are in spaced apart relationship.

64. The thermochromic device of claim 63 wherein the space or spaces between the substrates are evacuated.

65. The thermochromic device of claim 63 wherein the space or spaces between the substrates are filled with gas.

66. The thermochromic device of claim 65 wherein the gas includes krypton.

67. The thermochromic device of claim 39 wherein the thermochromic material(s) is present in a substrate or a layer which comprises a polyurethane.

68. The thermochromic device of claim 39 wherein the device includes an overcoating layer positioned between a source of environmental contamination and the thermochromic material(s).

69. The thermochromic device of claim 39 wherein the device includes a material that changes from less reflecting to more reflecting of NIR light as the temperature of said material is increased.

70. The thermochromic device of claim 62 wherein the device includes a low-e layer.

71. The thermochromic device of claim 62 wherein the device includes a UV barrier.

72. The thermochromic device of claim 70 wherein the device includes a UV barrier.

73. The thermochromic device of claim 39 wherein the substrate is a NIR light absorbing glass.

74. The thermochromic device of claim 39 wherein the substrate is tinted glass.

75. The thermochromic device of claim 39 wherein the substrate is glass formed into sheets by the drawn sheet process or the floatline process.

76. The thermochromic device of claim 39 wherein the substrate exhibits light transmission characteristics in conformance with the light transmission characteristics shown in curve 2 of FIG. 4.

77. A thermochromic device comprising:
a light transmitting substrate; and
at least one thermochromic material which changes reversibly from less light energy absorbing to more light energy absorbing as its temperature increases;
wherein the substrate provides static light energy absorbing character and the thermochromic material is present in the substrate or in a layer carried on the substrate.

78. The thermochromic device of claim 77 wherein the device comprises at least one additional material with residual light energy absorbing character.

79. The thermochromic device of claim 77 wherein the absorbance of a thermochromic material varies continuously due to its thermal equilibrium shift over the temperature range of 30° C. to 90° C.

80. The thermochromic device of claim 77 wherein a thermochromic material provides residual light energy absorbing character.

81. The thermochromic device of claim 77 wherein the substrate absorbs 5 percent or more of the sunlight incident on the device.

82. The thermochromic device of claim 77 wherein the substrate absorbs 10 percent or more of the sunlight incident on the device.

83. The thermochromic device of claim 77 wherein the substrate absorbs sufficient sunlight energy to cause a 10° C. or more temperature increase in the thermochromic material(s) when the device is exposed to full sunlight.

84. The thermochromic device of claim 77 wherein the substrate absorbs sufficient sunlight energy to cause a 20° C. or more temperature increase in the thermochromic material(s) when the device is exposed to full sunlight.

85. The thermochromic device of claim 77 wherein the thermochromic material(s) varies continuously from less light energy absorbing to more light energy absorbing over the temperature range from 25° C. to 85° C.

86. The thermochromic device of claim 77 wherein a thermochromic material(s) is a spiropyran, a spirooxazine or a chromene.

87. The thermochromic device of claim 77 wherein the chroma of the device in full sunlight has a $C^*_{ab}$ value of less than 20.

88. The thermochromic device of claim 77 wherein the device includes a barrier to UV light positioned between a source of UV light and the thermochromic material(s).

89. The thermochromic device of claim 88 wherein the device includes a low-e layer.

90. The thermochromic device of claim 77 wherein the device includes a barrier to UV light and SWV light positioned between a source of UV light and SWV light and the thermochromic material(s).

91. The thermochromic device of claim 77 wherein the device includes a low-e layer wherein the low-e layer is positioned with respect to the thermochromic material(s) such that said thermochromic material(s) resides between the low-e layer and the incident sunlight.

92. The thermochromic device of claim 77 wherein the substrate is tempered, toughened or strengthened glass.

93. The thermochromic device of claim 77 wherein the substrate has a non-infinite radius of curvature.

94. The thermochromic device of claim 77 wherein the substrate is provided with an edge treatment.

95. The thermochromic device of claim 77 wherein the device includes an adhesion promoter.

96. The thermochromic device of claim 77 wherein the device includes an antioxidant.

97. The thermochromic device of claim 77 wherein the device includes a heat stabilizer.

98. The thermochromic device of claim 77 wherein the device includes a plasticizer.

99. The thermochromic device of claim 77 wherein the device includes a light stabilizer.

100. The thermochromic device of claim 77 wherein the device includes one or more additional substrates.

101. The thermochromic device of claim 100 wherein the substrates are in a spaced apart relationship.

102. The thermochromic device of claim 101 wherein the space or spaces between the substrates are evacuated.

103. The thermochromic device of claim 101 wherein the space or spaces between the substrates are filled with gas.

104. The thermochromic device of claim 103 wherein the gas includes krypton.

105. The thermochromic device of claim 77 wherein the thermochromic material(s) is present in a substrate or a layer which comprises a polyurethane.

106. The thermochromic device of claim 77 wherein the device includes an overcoating layer positioned between a source of environmental contamination and the thermochromic material(s).

107. The thermochromic device of claim 77 wherein the device includes a material that changes from less reflecting to more reflecting of NIR light as the temperature of said material is increased.

108. The thermochromic device of claim 100 wherein the device includes a low-e layer.

109. The thermochromic device of claim 100 wherein the device includes a UV barrier.

110. The thermochromic device of claim 108 wherein the device includes a UV barrier.

111. The thermochromic device of claim 77 wherein the substrate is a NIR light absorbing glass.

112. The thermochromic device of claim 77 wherein the substrate is tinted glass.

113. The thermochromic device of claim 77 wherein the substrate is glass formed into sheets by the drawn sheet process or the floatline process.

114. The thermochromic device of claim 77 wherein the substrate exhibits light transmission characteristics in conformance with the light transmission characteristics shown in curve 2 of FIG. 4.

115. A thermochromic window comprising:
two or more light transmitting substrates;
at least one thermochromic material which changes reversibly from less light energy absorbing to more light energy absorbing as its temperature increases; and
at least one material with residual light energy absorbing character;
wherein the two or more substrates are spaced apart by one or more than one gas space.

116. The thermochromic window of claim 115 wherein at least one material with residual light energy absorbing character is a thermochromic material.

117. The thermochromic window of claim 115 wherein a substrate provides residual light energy absorbing character.

118. The thermochromic window of claim 115 wherein at least one material with residual light energy absorbing character is a static light energy absorbing material.

119. The thermochromic window of claim 115 wherein the material(s) with residual light energy absorbing character absorbs 5 percent or more of the sunlight incident on the window.

120. The thermochromic window of claim 115 wherein the material(s) with residual light energy absorbing character absorbs 10 percent or more of the sunlight incident on the window.

121. The thermochromic window of claim 115 wherein the material(s) with residual light energy absorbing character absorbs sufficient sunlight energy to cause a 10° C. or more temperature increase in the thermochromic material(s) when the window is exposed to full sunlight.

122. The thermochromic window of claim 115 wherein the material(s) with residual light energy absorbing character absorbs sufficient sunlight energy to cause a 20° C. or more temperature increase in the thermochromic material(s) when the window is exposed to full sunlight.

123. The thermochromic window of claim 115 wherein the thermochromic material(s) varies continuously from less light energy absorbing to more light energy absorbing over the temperature range from 30° C. to 90° C.

124. The thermochromic window of claim 115 wherein a thermochromic material(s) is a spiropyran, a spirooxazine or a chromene.

125. The thermochromic window of claim 115 wherein the chroma of the window in full sunlight has a $C^*_{ab}$ value of less than 20.

126. The thermochromic window of claim 115 wherein the window includes a barrier to UV light positioned between a source of UV light and the thermochromic material(s).

127. The thermochromic window of claim 126 wherein the window includes a low-e layer.

128. The thermochromic window of claim 115 wherein the window includes a barrier to UV light and SWV light positioned between a source of UV light and SWV light and the thermochromic material(s).

129. The thermochromic window of claim 115 wherein the window includes a low-e layer wherein the low-e layer is positioned with respect to the thermochromic material(s) such that said thermochromic material(s) resides between the low-e layer and the incident sunlight.

130. The thermochromic window of claim 115 wherein a substrate is tempered, toughened or strengthened glass.

131. The thermochromic window of claim 115 wherein a substrate has a non-infinite radius of curvature.

132. The thermochromic window of claim 115 wherein the substrate is provided with an edge treatment.

133. The thermochromic window of claim 115 wherein the window includes an adhesion promoter.

134. The thermochromic window of claim 115 wherein the window includes an antioxidant.

135. The thermochromic window of claim 115 wherein the window includes a heat stabilizer.

136. The thermochromic window of claim 115 wherein the window includes a plasticizer.

137. The thermochromic window of claim 115 wherein the window includes a light stabilizer.

138. The thermochromic window of claim 115 wherein the window includes more than two substrates.

139. The thermochromic window of claim 138 wherein three substrates are spaced apart by two spaces.

140. The thermochromic window of claim 139 wherein the spaces between the substrates are evacuated.

141. The thermochromic window of claim 139 wherein the spaces between the substrates are filled with gas.

142. The thermochromic window of claim 141 wherein the gas includes krypton.

143. The thermochromic window of claim 115 wherein the thermochromic material(s) is present in a substrate or a layer which comprises a polyurethane.

144. The thermochromic window of claim 115 wherein the window includes an overcoating layer positioned between a source of environmental contamination and the thermochromic material(s).

145. The thermochromic window of claim 115 wherein the window includes a material that changes from less reflecting to more reflecting of NIR light as the temperature of said material is increased.

146. The thermochromic window of claim 115 wherein the window includes a low-e layer.

147. The thermochromic window of claim 115 wherein the window includes a UV barrier.

148. The thermochromic window of claim 146 wherein the window includes a UV barrier.

149. The thermochromic window of claim 115 wherein a substrate is a NIR light absorbing glass.

150. The thermochromic window of claim 115 wherein a substrate is tinted glass.

151. The thermochromic window of claim 115 wherein a substrate is glass formed into sheets by the drawn sheet process or the floatline process.

152. The thermochromic window of claim 115 wherein the substrate exhibits light transmission characteristics in conformance with the light transmission characteristics shown in curve 2 of FIG. 4.

153. A thermochromic device comprising:

a light transmitting substrate;

at least one thermochromic material which changes reversibly from less light energy absorbing to more light energy absorbing as its temperature increases;

and at least one material with residual light energy absorbing character;

wherein the thermochromic material is present in the substrate, in a layer carried on the substrate, or on a layer carried on the substrate, and the material with residual light energy absorbing character may be the same or different than the thermochromic material and may be present in the same layer or in a different layer than the thermochromic material.

154. A thermochromic device comprising:

a light transmitting substrate;

at least one thermochromic material capable of reversibly increasing in light absorption as the temperature of the thermochromic material increases; and at least one material capable of absorbing incident sunlight and causing a temperature increase in the thermochromic material when the device is exposed to sunlight wherein the thermochromic material is present in the substrate, in a layer carried on the substrate, or on a layer carried on the substrate, and the material capable of absorbing incident sunlight and causing a temperature increase in the thermochromic material may be the same or different than the thermochromic material and may be present in the same layer or in a different layer than the thermochromic material.

155. A thermochromic window comprising:

a first light transmitting substrate;

a second light transmitting substrate;

at least one thermochromic material which changes reversibly from less light energy absorbing to more light energy absorbing as its temperature increases; and at least one material with residual light energy absorbing character;

wherein the thermochromic material is present in the first substrate, in a layer carried on the first substrate, or on a layer carried on the first substrate, and the material with residual light energy absorbing character may be the same or different than the thermochromic material and may be present in the same layer or in a different layer than the thermochromic material.

156. A thermochromic window comprising:

a first light transmitting substrate;

a second light transmitting substrate;

at least one thermochromic material capable of reversibly increasing in light absorption as the temperature of the thermochromic material increases; and at least one material capable of absorbing incident sunlight and causing a temperature increase in the thermochromic materials present when the device is exposed to sunlight; wherein the thermochromic material is present in the first substrate, in a layer carried on the first substrate, or on a layer carried on the first substrate, and the material capable of absorbing incident sunlight and causing a temperature increase in the thermochromic material may be the same or different than the thermochromic material and may be present in the same layer or in a different layer than the thermochromic material.

* * * * *